(12) United States Patent
Itou et al.

(10) Patent No.: US 7,773,191 B2
(45) Date of Patent: Aug. 10, 2010

(54) REFLECTIVE LIQUID CRYSTAL DISPLAY DEVICE COMPRISING A LIQUID CRYSTAL LAYER HAVING A TWIST ANGLE

(75) Inventors: Osamu Itou, Hitachi (JP); Shinichi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 96 days.

(21) Appl. No.: 11/476,212

(22) Filed: Jun. 28, 2006

(65) Prior Publication Data

US 2007/0132916 A1 Jun. 14, 2007

Related U.S. Application Data

(63) Continuation of application No. 09/930,208, filed on Aug. 16, 2001, now abandoned.

(30) Foreign Application Priority Data

Jan. 16, 2001 (JP) ................................. 2001-7712

(51) Int. Cl.
*G02F 1/1335* (2006.01)
*C09K 19/02* (2006.01)
(52) U.S. Cl. ...................... 349/180; 349/102; 349/113; 349/117; 349/121; 349/181
(58) Field of Classification Search .................. 349/117, 349/180
See application file for complete search history.

(56) References Cited

U.S. PATENT DOCUMENTS

| | | | |
|---|---|---|---|
| 5,241,408 A | 8/1993 | Ishikawa et al. | |
| 6,072,553 A | 6/2000 | Mitsui et al. | |
| 6,141,076 A | 10/2000 | Liu et al. | |
| 6,147,727 A * | 11/2000 | Shigeno | 349/99 |
| 6,323,926 B2 | 11/2001 | Watanabe et al. | |
| 6,327,010 B1 | 12/2001 | Scheuble et al. | |
| 6,341,002 B1 | 1/2002 | Shimizu et al. | |
| 6,362,862 B1 | 3/2002 | Itoh et al. | |
| 6,429,920 B1 * | 8/2002 | Dohi | 349/119 |

(Continued)

FOREIGN PATENT DOCUMENTS

JP 4-116515 4/1992

(Continued)

OTHER PUBLICATIONS

S. Chandrasekar, G.S. Ranganath, U.D. Kini, K.A. Suresh et al., Mol. Cryst. Liq. Cryst. vol. 24 (1973), pp. 201-211.

(Continued)

*Primary Examiner*—Andrew Schechter
*Assistant Examiner*—Charles Chang
(74) *Attorney, Agent, or Firm*—Dickstein Shapiro LLP

(57) ABSTRACT

The present invention provides a liquid crystal display device comprising a liquid crystal layer sandwiched between an upper substrate and a lower substrate having a twist angle in the range of about 40 to 65 degrees and a light diffusive reflective electrode having recesses and projections provided on the lower substrate wherein a product of the height of the recesses and projections and a birefringence of the liquid crystal layer is in the range of about 10 to 53 nm at the twist angle of about 40 degrees and about 10 to 64 nm at the twist angle of about 65 degrees, respectively.

2 Claims, 13 Drawing Sheets

U.S. PATENT DOCUMENTS

| | | |
|---|---|---|
| 6,628,359 B1 | 9/2003 | Terashita et al. |
| 6,661,484 B1 | 12/2003 | Iwai et al. |
| 6,680,766 B1 | 1/2004 | Larson et al. |
| 2002/0063826 A1* | 5/2002 | Okamoto et al. ............ 349/117 |
| 2003/0058385 A1 | 3/2003 | McKnight et al. |
| 2003/0058393 A1* | 3/2003 | Terashita et al. ............ 349/117 |

FOREIGN PATENT DOCUMENTS

| | | |
|---|---|---|
| JP | 06-075238 | 3/1994 |
| JP | 10-154817 | 6/1998 |
| JP | 10-239669 | 9/1998 |
| JP | 10002689 | 8/2000 |

OTHER PUBLICATIONS

Yasuo Fujimura, Tatsuki Nagatsuka, Hiroyuki Yoshimi, Takefumi Simomura et al., SID'91 Digest (1991) pp. 739-742.

* cited by examiner

FIG. 23

| TWIST ANGLE(DEGREE) | (HEIGHT OF RECESSES AND PROJECTIONS) × ($\Delta n$ OF LIQUID CRYSTAL MATERIAL)(nm) |
|---|---|
| 0 | 32 |
| 30 | 47 |
| 40 | 53 |
| 65 | 64 |
| 75 | 74 |
| 120 | 101 |

FIG. 24

| Nz | CR |
|---|---|
| -0.1 | 33.1 |
| 0 | 32.8 |
| 0.3 | 28 |
| 0.5 | 20.6 |
| 0.7 | 18.1 |
| 1 | 17.7 |

… # REFLECTIVE LIQUID CRYSTAL DISPLAY DEVICE COMPRISING A LIQUID CRYSTAL LAYER HAVING A TWIST ANGLE

This is a continuation of application Ser. No. 09/930,208, filed Aug. 16, 2001, now abandoned the entire disclosure of which is incorporated herein by reference.

FIELD OF THE INVENTION

The present invention relates to liquid crystal display devices, and particularly, to a reflection type liquid crystal display device.

DISCUSSION OF THE RELATED ART

Conventionally, in a reflection type liquid crystal display device, a light diffusing means such as a diffusive type reflective electrode is used, which prevents mirroring of ambient scene and mirror reflection, while external light is effectively utilized to increase light reflectance. As a result, the light reflected in the normal direction contains incident light coming from a wide range of viewing angles including from oblique directions. Therefore, the phase difference given to the incident light must be set to a quarter of wavelength in a one-way optical path length distributed over a wide range of viewing angles. However, in the known reflection type liquid crystal display devices using a single polarizing plate type display mode, the dependency of phase difference on the viewing angle is not reduced sufficiently, and the phase difference given to the transmitted light can vary greatly from a quarter of wavelength in oblique directions.

Also, the diffusive type reflective electrode used in the reflection type liquid crystal display device has a multiplicity of minute recesses and projections and is disposed adjacent to the liquid crystal layer, affecting the thickness of the liquid crystal layer. As a consequence, the optical parameters for achieving a phase difference of a quarter wavelength to the incident light are not provided. As a result, the light reflected at top and bottom portions of the multiplicity of recesses and projections cannot be sufficiently absorbed and a high contrast ratio cannot be obtained.

SUMMARY OF THE INVENTION

The present invention provides a reflection type liquid crystal display device having a high contrast ratio by optimizing the phase difference variations due to viewing angle variations and the thickness of the liquid crystal layer.

In an object of the present invention a liquid crystal display is provided comprising an upper substrate and a lower substrate disposed in a mutually facing relation, a liquid crystal layer sandwiched between the upper substrate and the lower substrate having a twist angle in the range of about 40 to 65 degrees and a light diffusive reflective electrode having recesses and projections provided on the lower substrate. The invention further provides a phase plate on an outer surface of the upper substrate and a polarizing plate provided on an outer surface of the phase plate wherein a product of the height of the recesses and projections and a birefringence of the liquid crystal layer is in the range of about 10 to 53 nm at the twist angle of about 40 degrees and about 10 to 64 nm at the twist angle of about 65 degrees, respectively.

In another object of the present invention a liquid crystal display device is provided comprising an upper substrate and a lower substrate disposed in a mutually facing relation, a liquid crystal layer sandwiched between the upper substrate and the lower substrate having a twist angle in the range of about 75 to 120 degrees and a light diffusive reflective electrode having recesses and projections provided on the lower substrate. The invention further provides a phase plate provided on an outer surface of the upper substrate and polarizing plate provided on an outer surface of the phase plate wherein a product of the height of the recesses and projections and a birefringence of the liquid crystal layer is in the range of about 10 to 74 nm at the twist angle of about 75 degrees and about 10 to 101 nm at the twist angle of about 120 degrees, respectively.

In yet another object of the present invention a liquid crystal display device is provided comprising an upper substrate and a lower substrate disposed in a mutually facing relation, a liquid crystal layer sandwiched between the upper substrate and the lower substrate having a twist angle in the range of about 0 to 30 degrees and a light diffusive reflective electrode having recesses and projections provided on the lower substrate. The invention further provides a phase plate provided on an outer surface of the upper substrate and a polarizing plate provided on an outer surface of the phase plate wherein a product of the height of the recesses and projections and a birefringence of the liquid crystal layer is in the range of about 10 to 32 nm at the twist angle of about 0 degrees and about 10 to 47 nm at the twist angle of about 30 degrees, respectively.

In another object of the present invention a liquid crystal display device is provided comprising an upper substrate and a lower substrate disposed in a mutually facing relation and a liquid crystal layer sandwiched between the upper substrate and the lower substrate having a twist angle in the range of about 40 to 65 degrees and a light diffusive reflective electrode having recesses and projections provided on the lower substrate wherein a product of the height of the recesses and projections and a birefringence of the liquid crystal layer is in the range of about 10 to 53 nm at the twist angle of about 40 degrees and about 10 to 64 nm at the twist angle of about 65 degrees, respectively.

In yet another object of the present invention a liquid crystal display device is provided comprising an upper substrate and a lower substrate disposed in a mutually facing relation and a liquid crystal layer sandwiched between the upper substrate and the lower substrate having a twist angle in the range of about 75 to 120 degrees and a light diffusive reflective electrode having recesses and projections provided on the lower substrate wherein a product of the height of the recesses and projections and a birefringence of the liquid crystal layer is in the range of about 10 to 74 nm at the twist angle of about 75 degrees and about 10 to 101 nm at the twist angle of about 120 degrees, respectively.

In another object of the present invention a liquid crystal display device is provided comprising an upper substrate and a lower substrate disposed in a mutually facing relation and a liquid crystal layer sandwiched between the upper substrate and the lower substrate having a twist angle in the range of about 0 to 30 degrees and a light diffusive reflective electrode having recesses and projections provided on the lower substrate wherein a product of the height of the recesses and projections and a birefringence of the liquid crystal layer is in the range of about 10 to 32 nm at the twist angle of about 0 degrees and about 10 to 47 nm at the twist angle of about 30 degrees, respectively.

In yet another object of the present invention, methods of fabricating a liquid crystal display as described above are provided herein. In one embodiment, the invention comprises the steps of providing an upper substrate and a lower substrate disposed in a mutually facing relation, providing a liquid crystal layer sandwiched between the upper substrate and the lower substrate having a twist angle in the range of about 40 to 65 degrees and providing a light diffusive reflective electrode having recesses and projections provided on the lower substrate. The method further provides the steps of providing a phase plate on an outer surface of the upper substrate and providing a polarizing plate on an outer surface of the phase plate wherein a product of the height of the recesses and projections and a birefringence of the liquid crystal layer is in the range of about 10 to 53 nm at the twist angle of about 40 degrees and about 10 to 64 nm at the twist angle of about 65 degrees, respectively.

BRIEF DESCRIPTION OF THE DRAWINGS

The above advantages and features of the invention will be more clearly understood from the following detailed description which is provided in connection with the accompanying drawings.

FIG. 23 illustrates the relationship between the twist angle and the product of the height of recesses and projection of a light-diffusive reflective electrode and birefringence of a liquid crystal material; and FIG. 24 illustrates the relationship between the Nz coefficient and the contrast ratio.

DETAILED DESCRIPTION OF THE INVENTION

Figure 1:
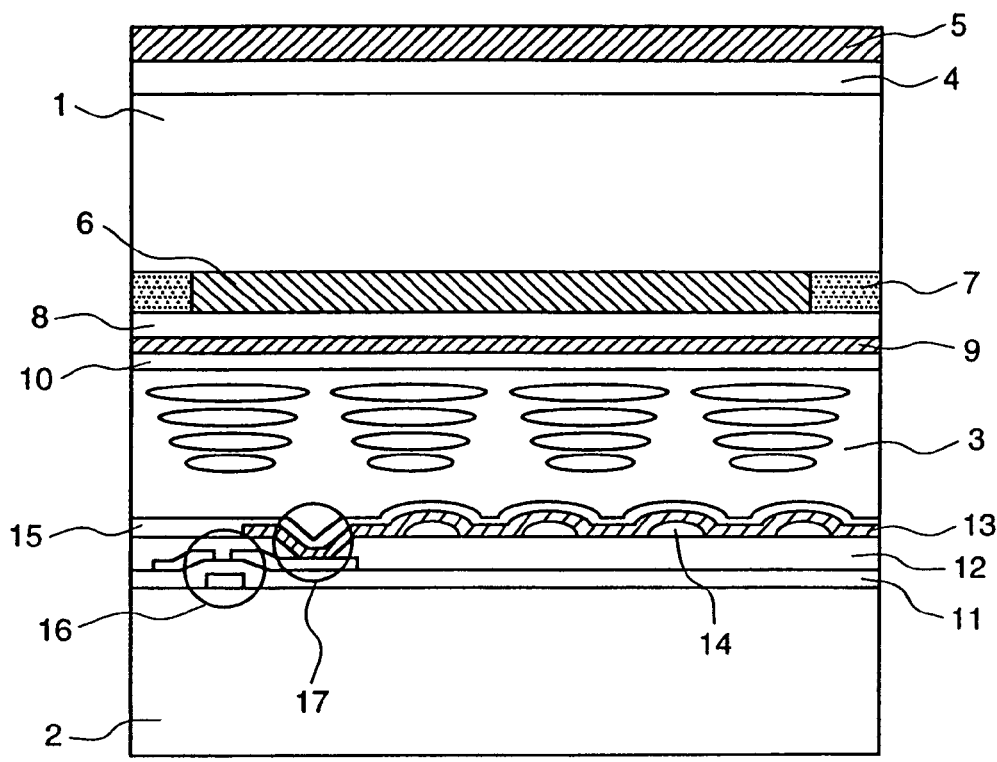
FIG. 1 illustrates a liquid crystal display device according to the present invention.

Exemplary embodiments of the present invention will be described below in connection with the drawings. Other embodiments may be utilized and structural or logical changes may be made without departing from the spirit or scope of the present invention. Like items are referred to by like reference numerals throughout the drawings.

Referring now to the figures, in FIG. 1, numeral 1 denotes an upper substrate, 2 a lower substrate, 3 a liquid crystal layer, 4 a phase plate, 5 a polarizing plate, 6 a color filter, 7 a black matrix, 8 a leveling layer, 9 a common electrode, 10 a first orientation layer, 11 a first insulation layer, 12 a second insulation layer, 13 a light-diffusive reflective electrode, 14 a recess and projection forming layer, 15 a second orientation layer, 16 a thin film transistor, and numeral 17 denotes a through-hole.

The upper substrate 1 is provided on one side (upper side) thereof with the phase plate 4 and the polarizing plate 5 and is provided on the other side (lower side) thereof with a combination portion of the color filter 6 and the black matrix 7, the flattening layer 8, the common electrode 9 and the first orientation film 10. The lower substrate 2 is provided on one side (upper side) thereof with the first insulation layer 11, the second insulation layer 12, the recess and projection forming layer 14, the light-diffusive reflective electrode 13 and the second orientation film 15. The liquid crystal layer 3 is sandwiched between the lower side of the upper substrate 1 and the upper side of the lower substrate 2. The thin film transistor 16 can be a reverse stagger type, and is disposed on the upper side of the lower substrate 2, and electrodes of the thin film transistor 16 are conductively connected respectively to a scanning line (not shown), a signal line (not shown) and the light-diffusive reflective electrode 13. The scanning line and the signal line are members of a group of scanning lines and a group of signal lines which are disposed in parallel respectively, and the scanning line group and the signal line group are disposed orthogonally to each other and insulated by the first insulation layer 11. The signal lines and the light-diffusive reflective electrode 13 are insulated from each other by the second insulation layer 12, while the light-diffusive reflective electrode 13 and the electrode of the thin film transistor 16 corresponding to each other are conductively connected to each other by the through-hole 17. The recess and projection forming layer 14 is disposed on the second insulation layer 12, to give a rugged pattern (recess-and-projection pattern) to the light-diffusive reflective electrode 13 disposed on the recess and projection forming layer 14. The second orientation layer 15 disposed on the light-diffusive reflective electrode 13 defines a liquid crystal orientation direction of the liquid crystal layer 3.

The upper substrate 1 is made, for example, of a borosilicate glass, and has a thickness of about 0.7 mm. The color filter 6 has a pattern of repeated stripes of red, green and blue transmission portions, and the black matrix 7 made of a resin is provided at portions corresponding to gaps between the pixels. Recesses and projections formed at the combination portion of the color filter 6 and the black matrix 7 are leveled by the leveling layer 8 made of a resin. The common electrode 9 is made, for example, of ITO (Indium Tin Oxide), and has a thickness of about 0.2 µm. The first orientation film 10 has a thickness of about 0.2 µm.

The lower substrate 2 is made of, for example, the same borosilicate glass as the upper substrate 1, and has a thickness of about 0.7 mm. The second orientation layer 15 has a thickness of about 0.2 µm. The signal lines and the scanning lines are made, for example, of chromium (Cr), and the first insulation layer 11 is made, for example, of silicon nitride (SiN). The second insulation layer 12 and the recess and projection forming layer 14 are made of organic materials. The recess and projection forming layer 14 are first formed in cylindrical form by photolithography and then formed in projected form by thermal softening. The recess and projection forming layer 14 is arranged at random so as to eliminate coloration due to light interference. In the recess and projection forming layer 14, the height of projected portions is selected to be about 0.5 µm and the shape of bottom portions is a circle with a diameter of about 8 µm.

Generally, in a reflection type liquid crystal display device, the contrast ratio is represented by the ratio of reflectance at the time of bright display and reflectance at the time of dark display, and the contrast ratio is affected primarily by the reflectance at the time of dark display. In addition, as the display mode of the reflection type liquid crystal display device, there is a normally open display mode in which a dark display condition is obtained when a voltage not less than a threshold voltage is applied to a liquid crystal layer and a normally closed display mode in which a dark display condition is obtained when a voltage not more than a threshold voltage is applied to the liquid crystal layer.

Since the liquid crystal layer is varied in its molecular alignment according to an applied voltage, there exists a difference in the molecular alignment at the time of dark display between the normally open display mode and the normally closed display mode. Hence, there exists a phase difference variation attendant on variation of the viewing angle and phase difference variation attendant on variation in the thickness of the liquid crystal layer.

As will be described later, the phase difference variation attendant on variation in the thickness of the liquid crystal layer is maximum at the application of zero voltage corresponding to a minimum tilt angle of the liquid crystal layer, and decreases as the applied voltage is gradually increased and the tilt angle is increased. However, the phase difference variation attendant on variation in viewing angle is minimum when the applied voltage is zero. Here, the phase difference variation attendant on the viewing angle variation is considerably greater in variation width as compared to the variation in the thickness of the liquid crystal layer and is the main cause of the variation. Therefore, the present invention adopts the normally closed display mode in which a dark display condition is obtained when the applied voltage is zero.

Meanwhile, the reflection type liquid crystal display device using the single polarizing plate type display mode has a constitution in which a polarizing plate, a phase plate, a liquid crystal layer and a light-diffusive reflective electrode are laminated from the display surface side. Optical characteristics in the normal direction of the liquid crystal layer at the time of non-application of voltage is described in Mol. Cryst. Liq. Cryst. Vol. 24 (1973), pp. 201-211, by S. Chandrasekar, G. S. Ranganath, U. D. Kini, K. A. Suresh et al. Namely, in the reflection type liquid crystal display device, it was presumed that, at the time when the light reflected by a light-diffusive reflective electrode is incident on a liquid crystal layer, the polarized state of the light is circularly polarized light, and the polarized state of the light transmitted through the liquid crystal layer is calculated. Further, phase difference variation attendant on variation in the thickness of the liquid crystal layer at the time when no voltage is applied to the liquid crystal layer was obtained from the results of the calculation.

The known reflection type liquid crystal display devices disclosed in the Japanese Patent Laid-Open No. Hei 6-75238 and No. Hei 10-154817 are designed by assessing the light scattering characteristics, the height of the recesses and projections, and the ratio of the height of the recesses and projections and a bottom side of the light-diffusive reflective electrode. However, in the case of a reflection type liquid crystal display device using a combination of the light-diffusive reflective electrode with a single polarizing plate type display mode, it is also necessary to assess the contrast ratio. In particular, in the case of a reflection type liquid crystal display device adopting the normally closed display mode, when the height of the recesses and projections of the light-diffusive reflective electrode is set to be not more than the allowable value, the phase difference variation attendant on viewing angle variation is brought to a good condition and, accordingly, a higher contrast ratio can be obtained.

Ordinarily, a light emission type display device such as a cathode ray tube and a transmission type liquid crystal display device gives a contrast ratio in excess of 100:1 when used in a dark room, but light reflection occurs at the display surface under an environment exposed to illumination light or solar light. In this case, light reflection is reduced by providing an anti-reflection film on the display surface, but a light reflection of about 1.0% is still generated. Since the intensity of environmental light in a light room or in the exterior in a cloudy weather is about 1000 cd/m$^2$, a light reflection of 10 cd/m$^2$ occurs in this case. Therefore, even if the luminance of the display portion is 200 cd/m$^2$, the influence of reflected light reduces the contrast ratio to about 20:1. Namely, where special use conditions such as use in a dark room are not added, even the transmission type liquid crystal display device is accompanied by an upper limit of contrast ratio of about 20:1. Accordingly, the present invention sets a target contrast ratio at 20:1.

Figure 2:
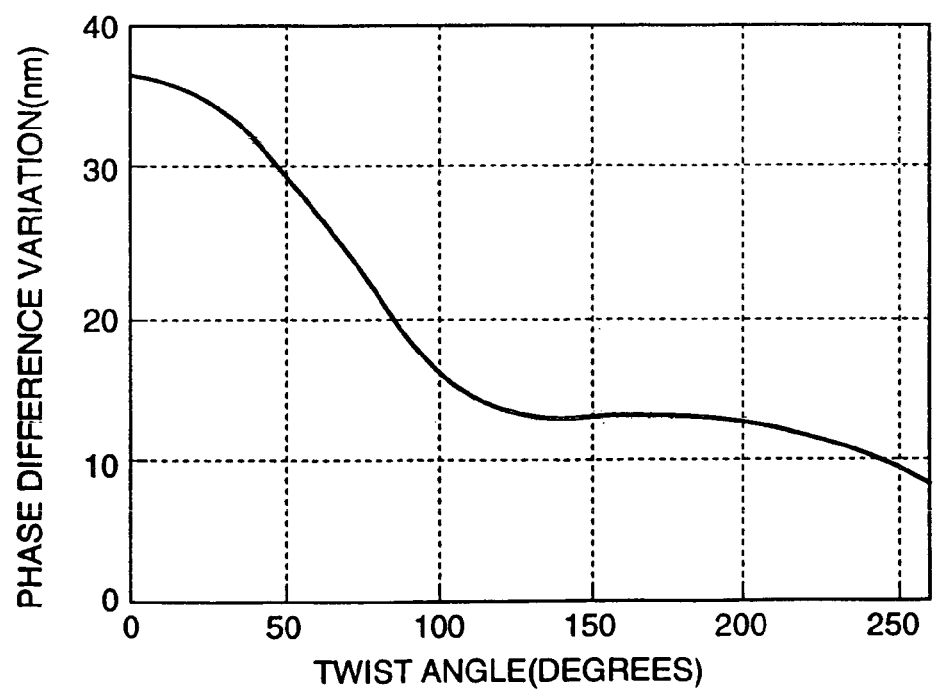
FIG. 2 illustrates the relationship between the twist angle of a liquid crystal layer and the phase difference variation attendant on the variation of thickness of the liquid crystal layer.

In FIG. 2, the abscissa is the twist angle of the liquid crystal layer expressed in degrees, while the ordinate is the phase difference variation attendant on variation of the thickness of the liquid crystal layer expressed in nm, and the phase difference variation when the thickness of the liquid crystal layer is varied by ±0.5 µm where the birefringence of the liquid crystal layer is 0.073 is shown. As shown in FIG. 2, the phase difference variation attendant on variation of the thickness of the liquid crystal layer takes a maximum value of 37 nm when the twist angle is 0 degrees, and gradually decreases as the twist angle increases. This is based on the fact that, as the twist angle increases, optical rotation occurs in the liquid crystal layer and the phase difference variation attendant on variation of the thickness of the liquid crystal layer becomes smaller than the variation of retardation.

Figure 3:
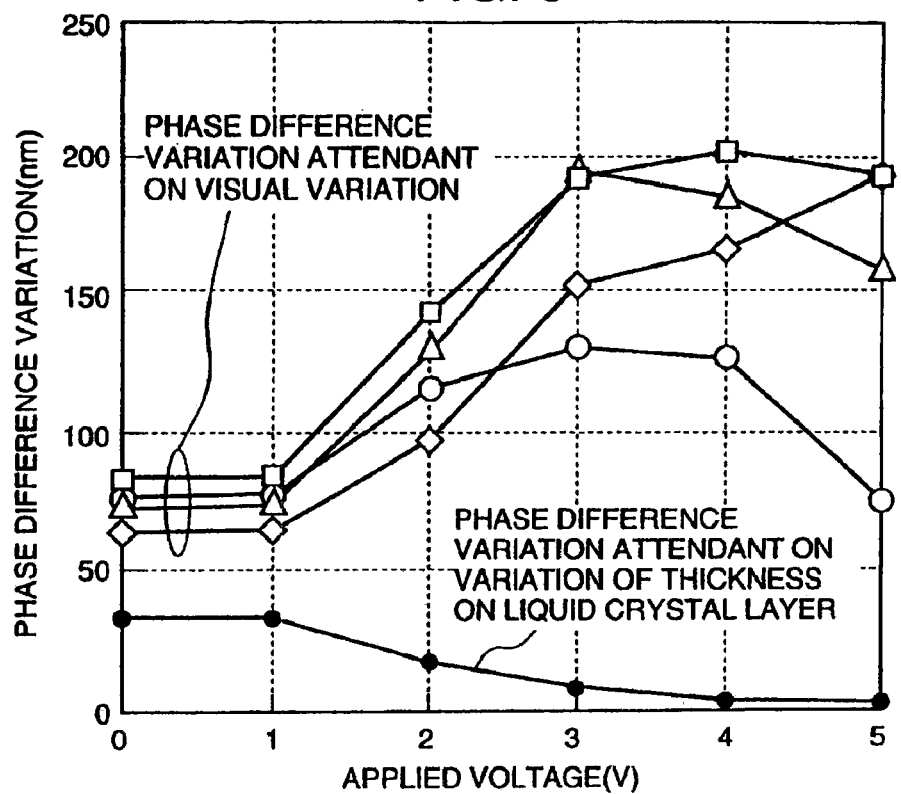
FIG. 3 illustrates the relationship between a voltage applied to a liquid crystal layer, phase difference variation attendant on viewing angle variation and phase difference variation attendant on variation of the thickness of the liquid crystal layer.

In FIG. 3, the abscissa is the voltage applied to the liquid crystal layer expressed in volts (V), while the ordinate is the phase difference variation attendant on viewing angle variation and variation of the thickness of the liquid crystal layer expressed in nm, where the polar angle is 40 degrees. In FIG. 3, the four characteristic curves represent the phase difference variation attendant on viewing angle variation corresponding to azimuth values of 0 degrees, 90 degrees, 180 degrees and 270 degrees, respectively, and the phase difference variation attendant on variation of the thickness of the liquid crystal layer represents the phase difference variation when the thickness of the liquid crystal layer is varied by ±0.5 μm.

As shown in FIG. 3, the phase difference variation attendant on viewing angle variation is minimum when the applied voltage is 0 V, irrespectively of the azimuth, whereas the phase difference variation attendant on variation of the thickness of the liquid crystal layer is maximum when the applied voltage is 0 V. When the phase difference variation attendant on the viewing angle variation and the phase difference variation attendant on the variation of the thickness of the liquid crystal layer are compared with each other in magnitude, the phase difference variation attendant on the viewing angle variation is greater (double or more) even at the time of an applied voltage of 0 V when the phase difference variation attendant on the liquid crystal layer thickness variation has a maximum value. Therefore, the present invention adopts the normally closed display mode in which a dark display condition is obtained when no voltage is applied.

Figure 4:
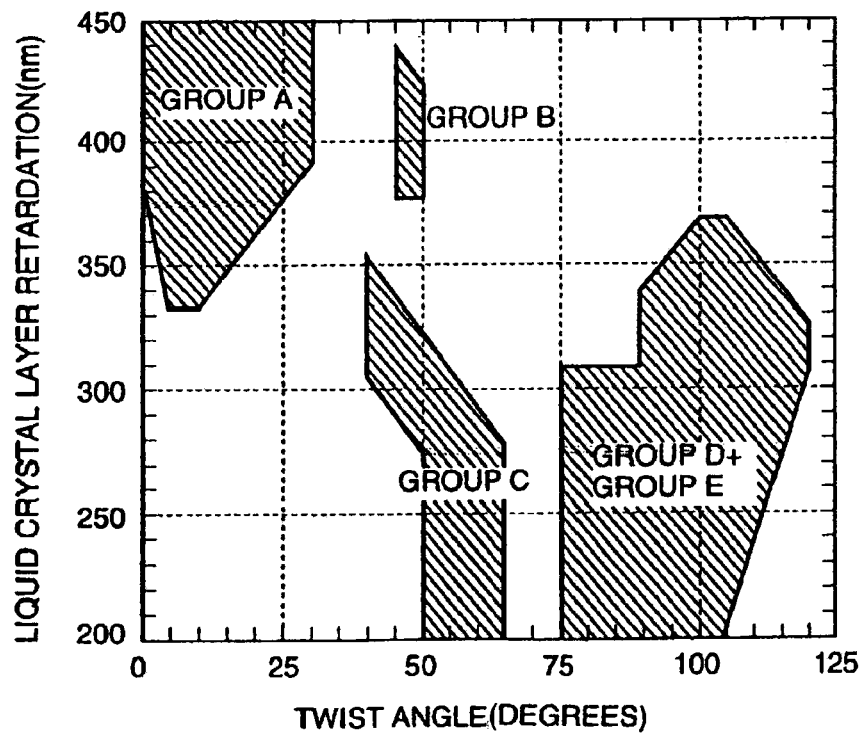
FIG. 4 illustrates the relationship between retardation and twist angle of the liquid crystal layer.
Figure 5:
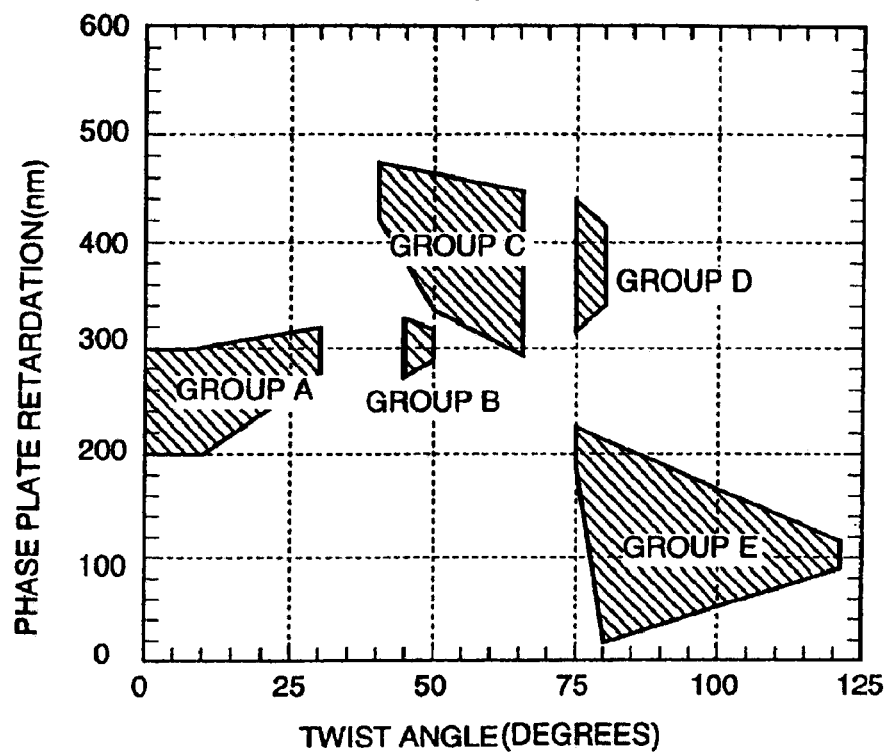
FIG. 5 illustrates the relationship between retardation of a phase plate and twist angle of the liquid crystal layer.

Meanwhile, in a first embodiment of the present invention, the solution of group C among the groups A to E showing the distribution regions of solutions for giving a high contrast shown in FIGS. 4 and 5 is selected. Again, in the characteristic diagram of FIG. 4, for the groups A to E showing the distribution regions of solution giving a high contrast, an allowable quantity of the height of recesses and projections of a light-diffusive reflective electrode is determined by paying attention to the minimum twist angle contained in each of the groups, whereby the entire portion of each of the groups satisfies the allowable quantity. In this case, the minimum twist angles of group A, group B, group C, group D and group E are respectively 0 degrees, 40 degrees, 40 degrees, 75 degrees and 75 degrees.

In FIG. 4, the abscissa is the twist angle of the liquid crystal layer expressed in degrees, and the ordinate is the retardation of the liquid crystal layer expressed in nm. In FIG. 5, the abscissa is the twist angle of the liquid crystal layer expressed in degrees, and the ordinate is the retardation of the phase plate expressed in nm. As shown in FIGS. 4 and 5, distribution regions (hatched regions) of solutions to give a high contrast constitute a plurality of groups, which are herein represented as group A, group B, group C, group D and group E.

Further, the vibrating direction of polarization (in this case, linear polarization or elliptic polarization close to linear polarization) of transmitted light transmitted through the phase plate was determined, and the absorption axis of the polarizing plate was set to be parallel in the vibrating direction. Hence, the light incident on the polarizing plate from the normal direction, transmitted through the phase plate and the liquid crystal layer, then reflected by the light-diffusive reflective electrode, again incident on the liquid crystal layer in the normal direction, and transmitted through the phase plate is absorbed sufficiently by the polarizing plate. When the phase difference variation attendant on viewing angle variation is reduced in the above setting, a high contrast can be obtained even where light is incident on the light-diffusive reflective electrode from a wide range of viewing angle. Besides, when the phase difference variation attendant on variation of the thickness of the liquid crystal layer is also reduced, a high contrast can be obtained even where the thickness of the liquid crystal layer is varied due to the presence of recesses and projections of the light-diffusive reflective electrode and the phase difference variation is thereby induced.

As described above, in order to minimize the phase difference variation attendant on viewing angle variation, the present invention adopts the normally closed display mode in which a dark display condition is obtained when no voltage is applied to the liquid crystal layer. In addition, an optimum combination of the characteristics of the liquid crystal layer and the characteristics of the phase plate is used, thereby further reducing the phase difference variation attendant on viewing angle variation. At this time, the liquid crystal layer when, no voltage is applied, has an uniaxial property (when the twist angle is 0 degrees), and Nz coefficient representing a three-dimension distribution of reflective index is 1.0. As described in SID'91 DIGEST (1991) pp. 739-742 by Yasuo Fujimura, Tatsuki Nagatsuka, Hiroyuki Yoshimi, Takefumi Simomura et al, the Nz coefficient is defined by the following formula:

$$Nz=(nx-nz)/(nx-ny)$$

where nx and ny are in-plane reflective indexes, nx is reflective index in the slow axis direction, while ny is reflective index in the fast axis direction, and nz is reflective index in the thickness direction.

Figure 11A:
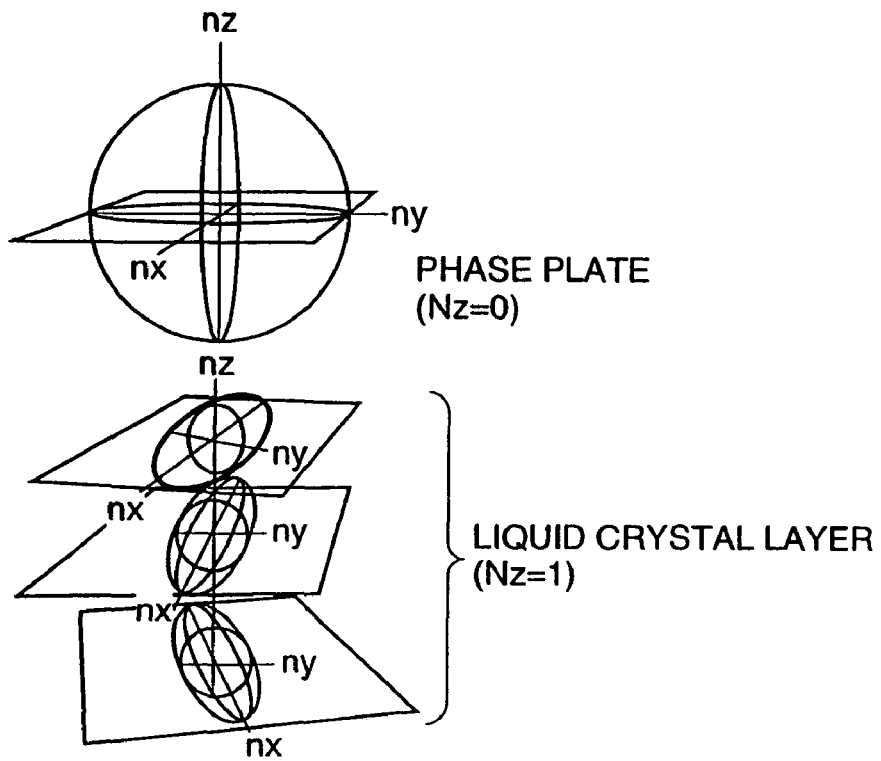
FIG. 11 illustrates a combination of a liquid crystal layer having an Nz coefficient of 1.0 and a phase plate having an Nz coefficient of 0.0.

In many cases, the liquid crystal layer of the single polarizing plate type display mode has a twisted orientation, as shown in FIG. 11(a). Since the twist angle can be not more than 90 degrees, the optical characteristics are close to those of an uniaxial medium having an Nz coefficient of 1.0. Therefore, by combining the liquid crystal layer having an Nz coefficient of 1.0 with the phase plate having an Nz coefficient of 0.0, the phase difference variation attendant on viewing angle variation can be reduced.

Figure 6:
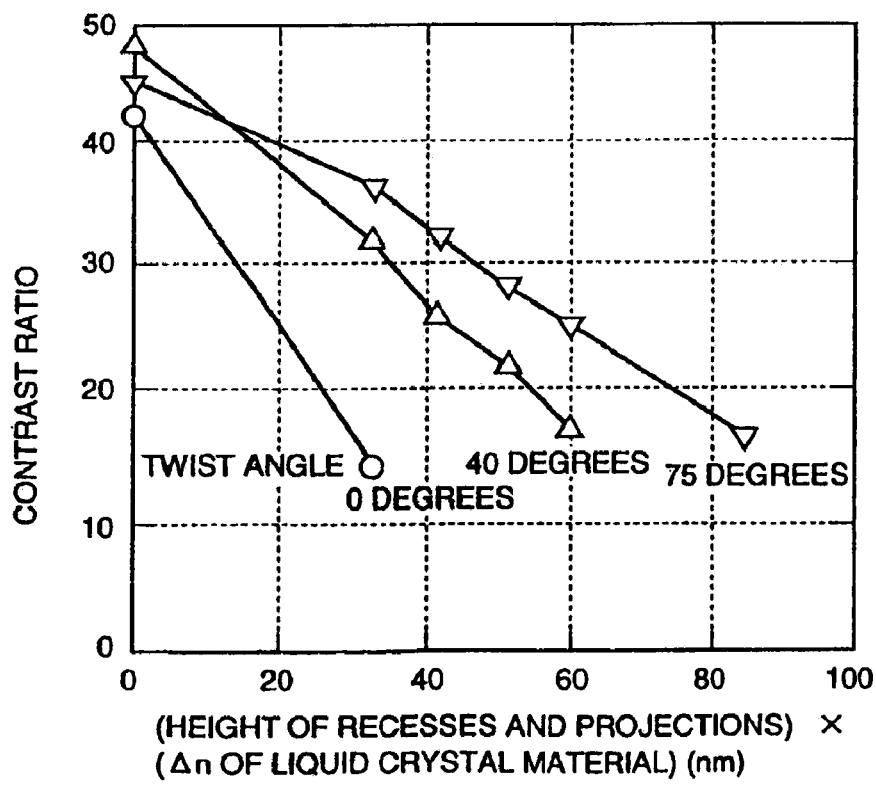
FIG. 6 illustrates the relationship between contrast ratio and the product of the height of recesses and projections of a light-diffusive reflective electrode and birefringence of a liquid crystal material.

In FIG. 6, the abscissa is the product of the height of the recesses and projections expressed in nm and the birefringence (Δn) of the liquid crystal material, while the axis of ordinate is the contrast ratio, and the three characteristic curves correspond to minimum twist angles of the liquid crystal layer of 0 degrees, 40 degrees and 75 degrees respectively. As shown in FIG. 6, the contrast ratio decreases linearly as the product of the height of the recesses and projections and the birefringence of the liquid crystal material increases, and the ratio of the linear decrease is decreased as the minimum twist angle increases. In other words, the allowable height of the recesses and projections of the light-diffusive reflective electrode increases as the minimum twist angle increases. In FIG. 6, the contrast ratio of 20:1 which is a target adopted in the present invention is indicated by the broken line. Where the minimum twist angles are 0 degrees, 40 degrees and 75 degrees, the contrast ratio of 20:1 is obtained when the products of the height of the recesses and projections and the birefringence of the liquid crystal material are not more than 32 nm, not more than 53 nm and not more than 74 nm, respectively. Accordingly, in the cases of group A, group B, group C, group D and group E, the contrast ratio of 20:1 is obtained when the products of the height of the recesses and projections and the birefringence of the liquid crystal material are set to be not more than 32 nm, not more than 53 nm, not more than 53 nm, not more than 74 nm, and not more than 74 nm, respectively. For example, where the birefringence of the liquid crystal material is 0.073, the heights of the recesses and projections allowable for group A, group B, group C, group D and group E are not more than 0.44 µm, not more than 0.73 µm, not more than 0.73 µm, not more than 1.0 µm, and not more than 1.0 µm, respectively.

In the case of producing the light-diffusive reflective electrode having such a height of recesses and projections as above, the actual machining precision for the recesses and projections has a limitation, so that the height of the recesses and projections has a lower limit. Ordinarily, the recesses and projections of the light-diffusive reflective electrode are formed by etching of an organic film. Since the etching precision of the organic film is about 3 µm and the ratio of the height of the recesses and projections and the bottom side for giving good light diffusing characteristics is in the range of 1:13 to 1:18, the lower limit of the height of the recesses and projections of the light-diffusive reflective electrode is about 0.17 µm. At present, the lower limit of the birefringence of the liquid crystal material is 0.06, so that the lower limit of the product of the height of the recesses and projections and the birefringence of the liquid crystal material is 0.01 µm.

Where the minimum twist angles are 30 degrees, 65 degrees and 120 degrees, the contrast ratio of 20:1 is obtained when the products of the height of the recesses and projections and the birefringence of the liquid crystal material are not more than 47 nm, not more than 64 nm and not more than 101 nm, respectively. Accordingly, in the cases of group A, group B, group C, group D and group E, the contrast ratio of 20:1 is obtained when the products of the height of the recesses and projections and the birefringence of the liquid crystal material are set to be not more than 47 nm, not more than 64 nm, not more than 64 nm, not more than 101 nm, and not more than 101 nm, respectively.

Incidentally, the values of birefringence of the phase plate and the liquid crystal material vary depending on the wavelength of light. A helium-neon laser with a light wavelength of 633 nm is often used in ordinary measurements, and the above-mentioned values are defined by the values obtained using light with a wavelength of 633 nm. Similarly, the retardation represented by the product of birefringence and thickness is also defined by the values obtained using light with a wavelength of 633 nm.

Figure 7:
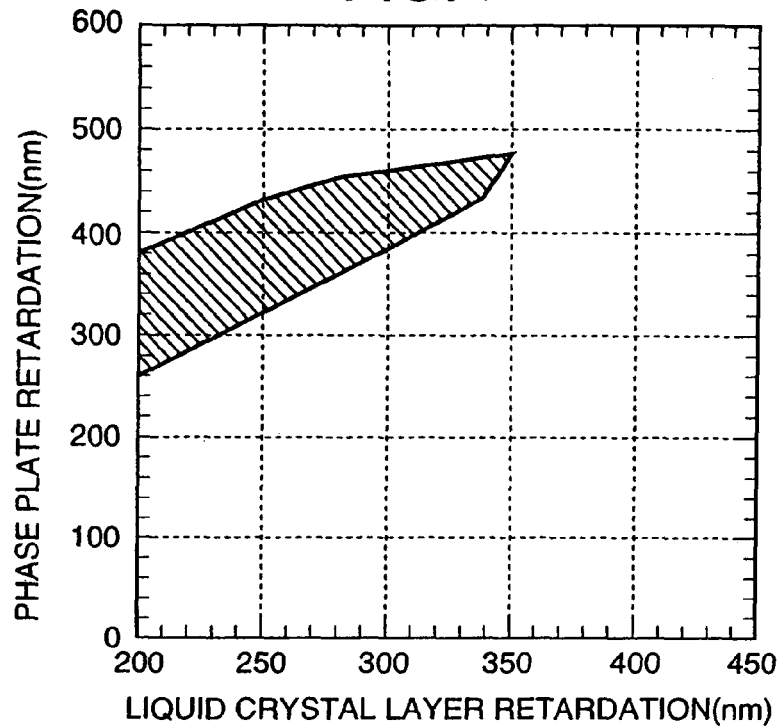
FIG. 7 illustrates the relationship between liquid crystal layer retardation and phase plate retardation in the solution of group C.
Figure 8:
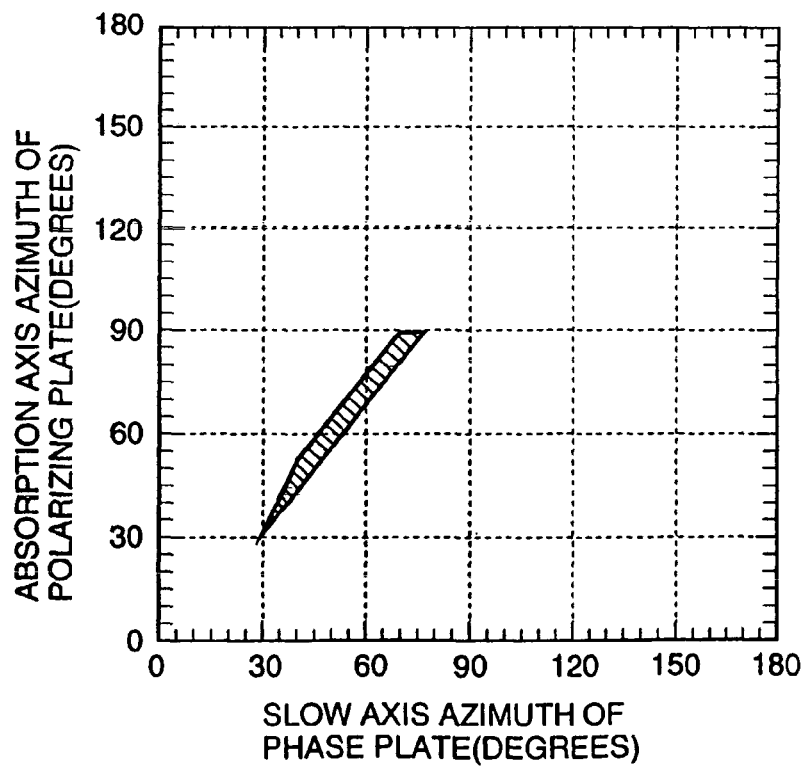
FIG. 8 illustrates the relationship between absorption axis azimuth of a polarizing plate and the slow axis azimuth of the phase plate in the solution of group C.

In FIG. 7, the abscissa is the liquid crystal layer retardation expressed in nm, and the ordinate is the phase plate retardation expressed in nm. In FIG. 8, the abscissa is the phase plate slow axis azimuth expressed in degrees, and the ordinate is the polarizing plate absorption axis azimuth expressed in degrees. In the first embodiment, a combination of characteristics is selected so as to fulfill the conditions for the solution. Namely, as shown in FIG. 7, the retardation of the liquid crystal layer 3 is in the range of 200 to 350 nm, and the retardation of the phase plate 4 is in the range of 280 to 470 nm. At the same time, as shown in FIG. 8, the slow axis azimuth of the phase plate 4 is in the range of 30 to 75 degrees, and the absorption axis azimuth of the polarizing plate 5 is in the range of 30 to 90 degrees. In this case, the azimuth is defined counterclockwise by observing the liquid crystal display device from the normal direction of the upper substrate 1 and setting the orientation direction of the lower substrate 2 to be 0 degrees.

In the first embodiment, since the solution of group C is selected, the optical parameters of the liquid crystal layer 3, the phase plate 4 and the polarizing plate 5 were selected as follows. From the characteristic diagram of FIG. 4, the product of the liquid crystal layer thickness and the birefringence of the liquid crystal material was selected to be 280 nm, and the twist angle of the liquid crystal layer 3 is selected to be 50 degrees. From the characteristic diagram of FIG. 5, the retardation of the phase plate 4 was selected to be 400 nm and from the characteristic diagram of FIG. 8, the slow axis azimuth of the phase plate 4 was selected to be 50 degrees, and the absorption axis azimuth of the polarizing plate 5 was selected to be 70 degrees.

Furthermore, in the first embodiment, the twist angle of the liquid crystal layer 3 is selected to be 50 degrees, and, in the characteristic diagram of FIG. 6, the straight line corresponding to a twist angle of 40 degrees was studied. In the straight line, the product of the height of the recesses and projections and the birefringence of the liquid crystal material which gives a contrast ratio of 20:1 is determined to be not more than 53 nm. Therefore, the product of the height of the recesses and projections and the birefringence of the liquid crystal layer was set to be not more than 53 nm. In this case, when a liquid crystal material having a birefringence of 0.073 is used, the allowable height of the recesses and projections is 0.73 µm allowing adoption of therefore, a slightly lower value of 0.5 µm.

In the first embodiment, as the liquid crystal layer 3, a fluorine-containing liquid crystal material having a birefringence of 0.073 and high resistance in which true spherical polymer beads having a diameter of 4.0 µm are dispersed in a proportion of about 100 pieces per 1 $mm^2$ is used. By using these parameters, the thickness of the liquid crystal layer is made to be 3.9 µm at an intermediate position of the recesses and projections over the entire part of the display portion.

The first orientation film 10 and the second orientation film 15 used at interfaces with the liquid crystal layer 3 are oriented by a rubbing method. In the orientation treatment, the speed of a rubbing roll is 3000 revolutions/min, the width of a contact portion of the rubbing roll with the substrate is 11 mm, and a pre-tilt angle of the liquid crystal layer 3 is about 5 degrees. The azimuth of the orientation treatment is appropriately set so that the twist angle of the liquid crystal layer 3 is 50 degrees when the liquid crystal material is poured into a gap portion between the upper substrate 1 and the lower substrate 2. As the phase plate 4, an NRZ film with an Nz coefficient of 0.0 was used.

As to the reflection type liquid crystal display device of the first embodiment obtained as above, reflectance of incident light in the case of uniform incident light within a solid angle range of 45 degrees relative to the normal direction was measured, and display characteristics were evaluated.

Figure 9:
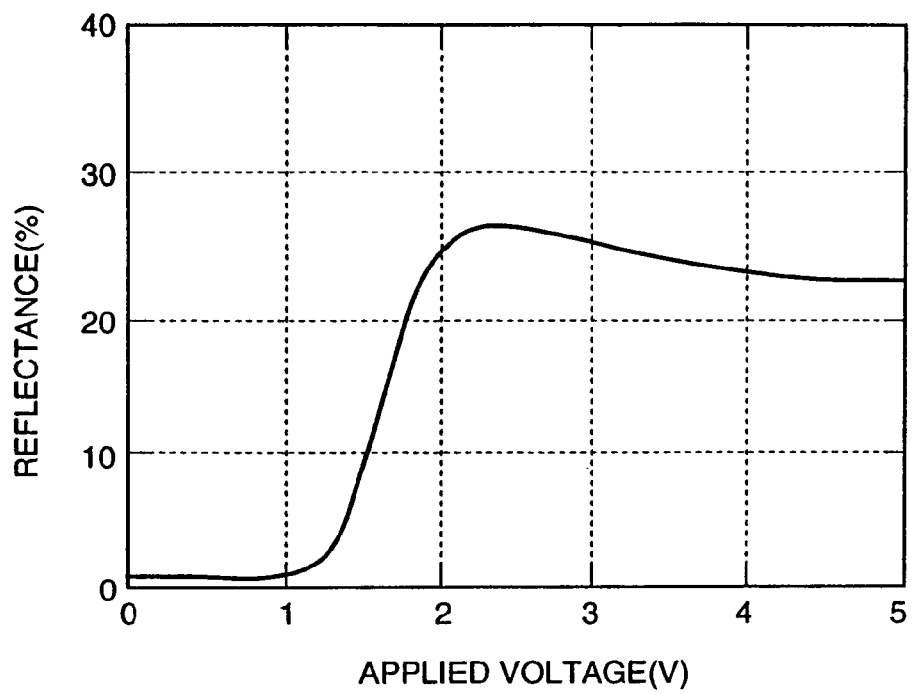
FIG. 9 illustrates the relationship between a voltage applied to the liquid crystal layer and reflectance.

FIG. 9 shows evaluation of the reflection type liquid crystal display device according to the first embodiment, and, more specifically, is a characteristic diagram showing the relationship between the voltage applied on the liquid crystal layer and reflectance. In FIG. 9, the abscissa is the applied voltage expressed in bolts (V), and the axis of ordinate is reflectance expressed in %. Also, as shown in FIG. 9, the reflection type liquid crystal display device of the first embodiment gave typical normally closed display characteristics such that the reflectance is minimum at the time of non-application of voltage and is steeply increased when the applied voltage increases in excess of 1 V. In this case, the maximum of the reflectance is obtained when the applied voltage is 2.7 V, the maximum reflectance is 5.6% and contrast ratio is 31:1.

Thus, according to the first embodiment, by selecting the height of recesses and projections of the light-diffusive reflective electrode 13 to be not more than the allowable value, it is possible to obtain a reflection type liquid crystal display device of the normally closed display mode with excellent viewing angle characteristics and a high contrast ratio.

Incidentally, in the reflection type liquid crystal display device of the first embodiment, the allowable value of the height of recesses and projections of the light-diffusive reflective electrode 13 is not more than 0.73 μm, and, when display characteristics were studied for cases where the height of the recesses and projections have a value outside of the allowable range, for example, where the height of recesses and projections was 1.0 μm, the contrast ratio was as low as 14:1. Thus, it is understood that a high contrast ratio cannot be obtained if the height of recesses and projections of the light-diffusive reflective electrode 13 is not in the allowable range.

In the first embodiment, the solution at the twist angle of 50 degrees was determined by using 40 degrees which is the minimum twist angle of solution contained in group C for the allowable range of the height of recesses and projections. When the allowable range of the height of recesses and projections is determined by using the twist angle of 50 degrees, a wider allowable range can be obtained more accurately than using the twist angle of 40 degrees.

Figure 10:
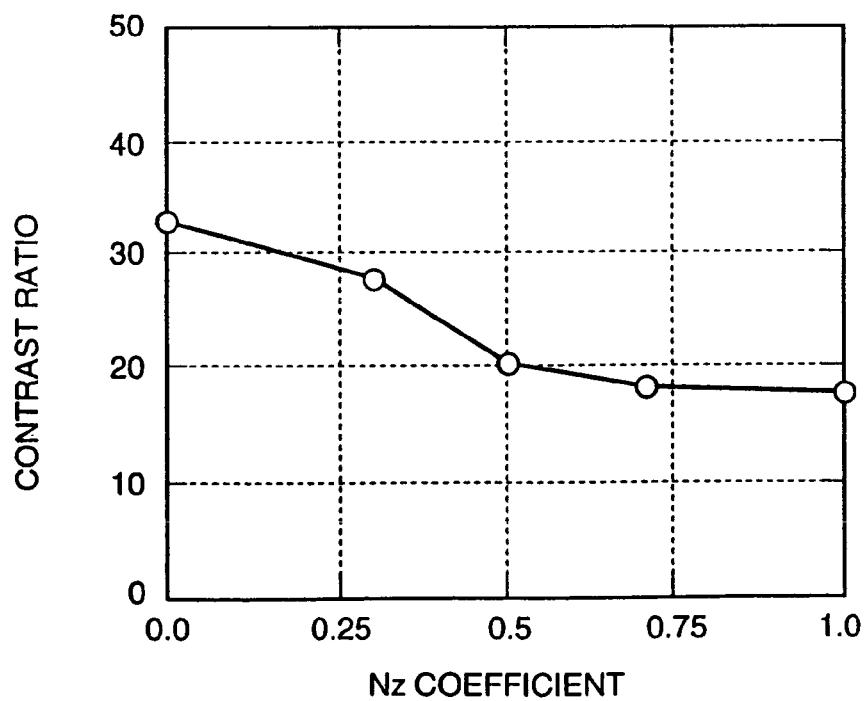
FIG. 10 illustrates the relationship between contrast ratio and Nz coefficient of the phase plate.

While the phase plate 4 with an Nz coefficient of 0.0 is used in the reflection type liquid crystal display device according to the first embodiment, when the Nz coefficient of the phase plate 4 is varied, the contrast ratio also is varied accordingly. FIG. 10 is a characteristic diagram showing the relationship between the contrast ratio and the Nz coefficient of the phase plate 4 in the reflection type liquid crystal display device of the first embodiment. In FIG. 10, the abscissa is the Nz coefficient, and the axis of ordinate is the contrast ratio. Also, as shown in FIG. 10, the maximum contrast ratio is obtained when the Nz coefficient is 0.0, and the contrast ratio gradually decreases as the Nz coefficient increases. The range of contrast ratio of 20:1 which is a target value in the present invention can be obtained when the Nz coefficient is not more than 0.5. Furthermore, as shown in FIG. 23, acceptable ranges of the Nz coefficient include values less than zero. For example, when the Nz coefficient is −0.1, the contrast ration has a high value of 33.1.

Figure 11B:
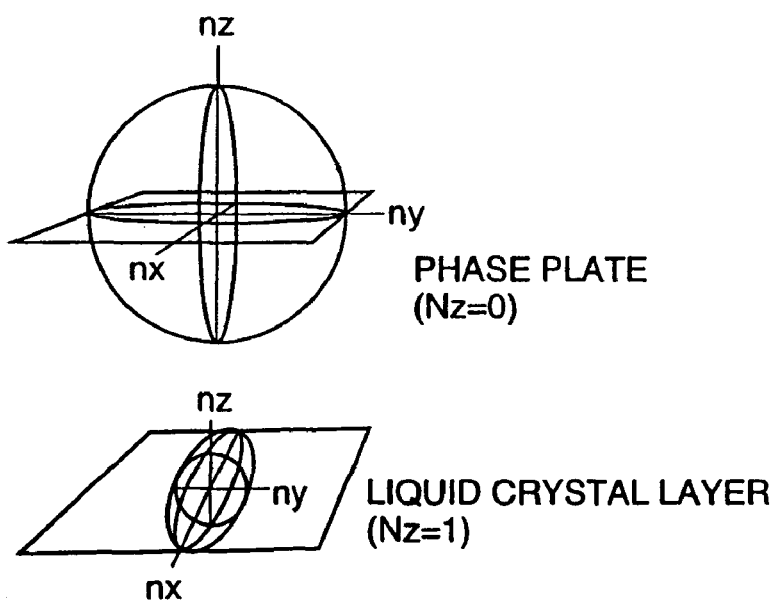

As shown in FIG. 11(b), when the phase plate 4 with an Nz coefficient of 0.0 and the liquid crystal layer 3 as an uniaxial medium with an Nz coefficient of 1.0 are combined and disposed such that the slow axis of the phase plate 4 and the orientation direction of the liquid crystal layer 3 are orthogonal as viewed from the normal direction, the slow axes of the phase plate 4 and the liquid crystal layer 3 are orthogonal to each other in all viewing angle directions, and the phase difference between the phase plate 4 and the liquid crystal layer 3 is favorably compensated for. In fact, while the liquid crystal layer 3 in the single polarizing type display mode often has a twisted orientation as shown in FIG. 11(a), since the twist angle is not more than 90 degrees, particularly, since the reflection type liquid crystal display device of the first embodiment has a small twist angle of 50 degrees, the optical characteristics are similar to those of an uniaxial medium with an Nz coefficient of 1.0.

In the reflection type liquid crystal display device of the first embodiment, the slow axis of the phase plate 4 is set to be 55 degrees relative to the orientation direction of the lower substrate 2. The setting conditions correspond to the setting at 105 degrees relative to the orientation direction of the upper substrate 1, and the setting at 80 degrees relative to the average orientation direction of the liquid crystal layer 3 (orientation direction at the center of the liquid crystal layer 3), and is similar to the conditions shown in FIG. 11(b). In such an arrangement of the phase plate, when the Nz coefficient is brought toward the ideal value of 0.0, the viewing angle characteristics are favorably compensated, and a higher contrast ratio can be obtained.

As shown in FIGS. 11(a) and (b), the phase plate having the Nz coefficient of 0.0 has a index ellipsoid of a circular disk-like elliptic form, while the liquid crystal layer having the Nz coefficient of 1.0 has a index ellipsoid of a oval elliptic form. Since the index ellipsoids are different from each other, the phase difference is compensated for even in visual directions where the reflectance in the thickness direction contributes. Further, when the orientation direction of the liquid crystal layer and the slow axis of the phase plate are disposed in orthogonal condition as viewed in the normal direction, the slow axis of the phase plate and the slow axis of the liquid crystal layer are orthogonal to each other in all visual directions, and the phase difference is compensated in all viewing directions for in better conditions.

As described above, in the normally closed display mode in which a dark display condition is obtained when voltage is not applied to the liquid crystal layer, the phase difference variation attendant on variation of the thickness of the liquid crystal layer is maximum at the time of the dark display condition. This is due to the fact that the apparent birefringence of the liquid crystal layer is substantially equal to the birefringence of the liquid crystal material when no voltage is applied. In this case, the normally open display mode in which a dark display condition is obtained at the time of application of a voltage when the apparent birefringence of the liquid crystal layer becomes substantially 0 is not accompanied by any restrictions as to the height of the recesses and projections of the light-diffusive reflective electrode, whereas the normally closed display mode used in the present invention is accompanied by allowable values as to the height of the recesses and projections of the light-diffusive reflective electrode.

Figure 12:
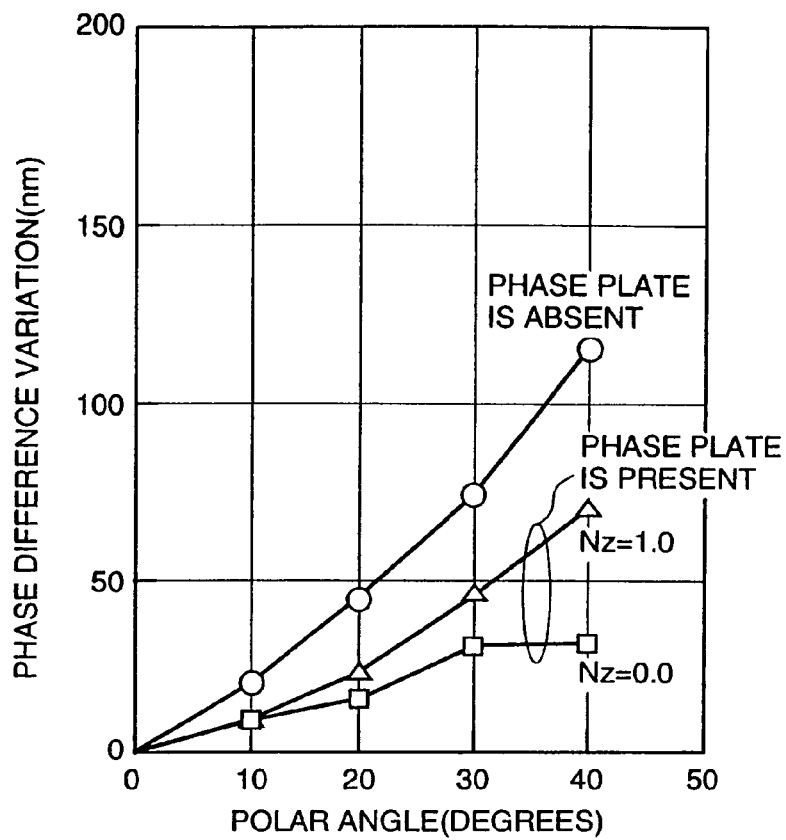
FIG. 12 illustrates the relationship between variation of viewing angle (polar angle) and phase difference variation.

In FIG. 12, the abscissa is the viewing angle (polar angle) expressed in degrees, while the ordinate is the phase difference variation expressed in nm, and there are shown, a case where the Nz coefficient of the phase plate 4 is 0.0, a case where the Nz coefficient is 1.0 and a case where the phase plate 4 is absent. As shown in FIG. 12, the phase difference variation is minimum when the viewing angle (polar angle) is minimum, and gradually increases as the viewing angle (polar angle) increases. In this case, the phase difference variation is smaller in the case of using the phase plate 4 than in the case of not using the phase plate 4. In the cases of using the phase plate 4, the phase difference variation is smaller in the case of using the phase plate 4 with an Nz coefficient of 0.0 as compared to the case of using the phase plate with an Nz coefficient of 1.0, which supports that a high contrast ratio is obtained when the phase plate 4 with an Nz coefficient of 0.0 is used.

Next, in a second embodiment of the present invention, among groups A to E showing distribution regions of solutions giving a high contrast shown in FIGS. 4 and 5, the solution of group A is selected. Here, FIG. 14 is a characteristic diagram showing the relationship of liquid crystal layer retardation and phase plate retardation in the solution of group A, and FIG. 15 is a characteristic diagram showing the relationship between polarizing plate absorption axis azimuth and phase plate slow axis azimuth in the solution of group A.

Figure 14:
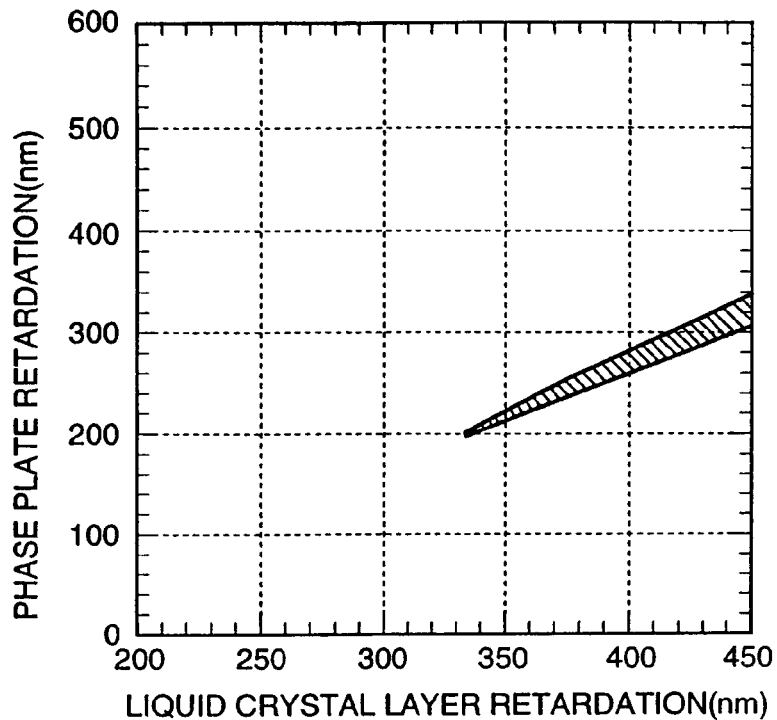
FIG. 14 illustrates the relationship between liquid crystal layer retardation and phase plate retardation in the solution of group A.
Figure 15:
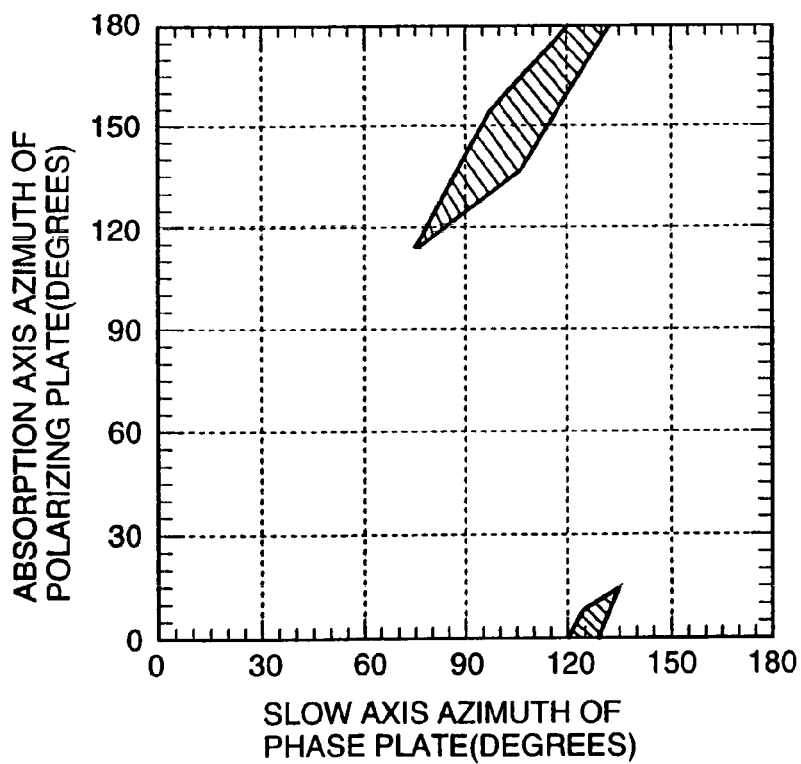
FIG. 15 illustrates the relationship between absorption axis azimuth of the polarizing plate and slow axis azimuth of the phase plate in the solution of group A.

In FIG. 14, the axis of abscissa is the liquid crystal layer retardation expressed in nm, and the axis of ordinate is the phase plate retardation expressed in nm. In FIG. 15, the axis of abscissa is the phase plate slow axis azimuth expressed in degrees, and the axis of ordinate is the polarizing plate absorption axis azimuth expressed in degrees.

In the second embodiment, combinations for fulfilling the solution are selected and set as follows. As shown in FIG. 14, the retardation of the liquid crystal layer 3 is in the range of 360 to 350 nm, and the retardation of the phase plate 4 is in the range of 200 to 340 nm. At the same time, as shown in FIG.

15, the slow axis azimuth of the phase plate 4 is in the range of 80 to 135 degrees, and the absorption axis azimuth of the polarizing plate 5 is in the ranges of 0 to 15 degrees and 80 to 180 degrees.

Since the solution of group A is selected in the second embodiment, optical parameters of the liquid crystal layer 3, the phase plate 4 and the polarizing plate 5 were selected as follows. From the characteristic diagram shown in FIG. 4, the product of the liquid crystal layer thickness and birefringence of the liquid crystal material was selected to be 410 nm, and the twist angle of the liquid crystal layer 3 was selected to be 20 degrees. In addition, from the characteristic diagram shown in FIG. 5, the retardation of the phase plate 4 was selected to be 260 nm. Further, from the characteristic diagram shown in FIG. 15, the slow axis azimuth of the phase plate 4 was selected to be 120 degrees, and the absorption axis azimuth of the polarizing plate 5 was selected to be 170 degrees.

Furthermore, while the twist angle of the liquid crystal layer 3 is selected to be 20 degrees in the second embodiment, attention was paid to the straight line of the twist angle of 0 degrees in the characteristic diagram shown in FIG. 6. When the product of the height of recesses and projections and birefringence of the liquid crystal material for giving a contrast ratio of 20:1 in the straight line is determined, the product of the height of recesses and projections and the birefringence of the liquid crystal material is not more than 27 nm, and, therefore, the product of the height of recesses and projections and the birefringence of the liquid crystal material was set to be not more than 27 nm. In this case, if a liquid crystal material with a birefringence of 0.065 is used, the allowable height of the recesses and projections is 0.49 μm, and, therefore, a slightly lower value of 0.4 μm was adopted.

When the reflection type liquid crystal display device of the second embodiment obtained as above was evaluated, display characteristics of a normally closed type were obtained, the maximum of reflectance was 25.6%, and the contrast ratio was 32:1.

Incidentally, while the allowable height of recesses and projections of the light-diffusive reflective electrode 13 is not more than 0.49 μm in the reflection type liquid crystal display device of the second embodiment, when the display characteristics of such a setting that the height of the recesses and projections has a value outside of the allowable range, for example, a setting with the height of recesses and projections of 1.0 μm were evaluated, the contrast ratio was found to be as low as 8:1. Thus, it is understood that a high contrast ratio cannot be obtained if the height of recesses and projections of the light-diffusive reflective electrode 13 is not set in the allowable range.

Next, in a third embodiment of the present invention, among the groups A to E showing the distribution regions of solutions giving a high contrast shown in FIGS. 4 and 5, the solution of group B is selected. Here, FIG. 16 is a characteristic diagram showing the relationship between liquid crystal layer retardation and phase plate retardation in the solution of group B, and FIG. 17 is a characteristic diagram showing the relationship between polarizing plate absorption axis azimuth and phase plate slow axis azimuth in the solution of group B.

Figure 16:
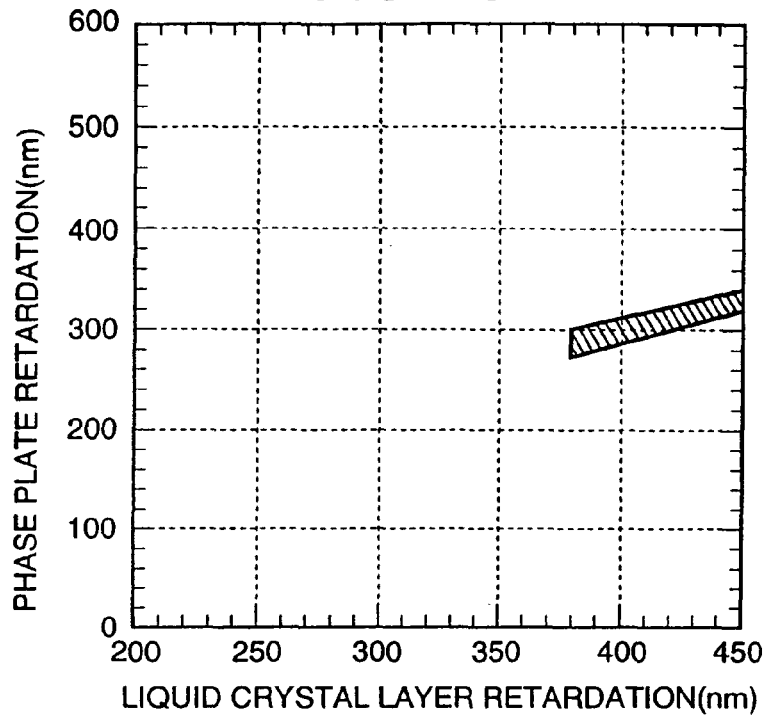
FIG. 16 illustrates the relationship between liquid crystal layer retardation and phase plate retardation in the solution of group B.
Figure 17:
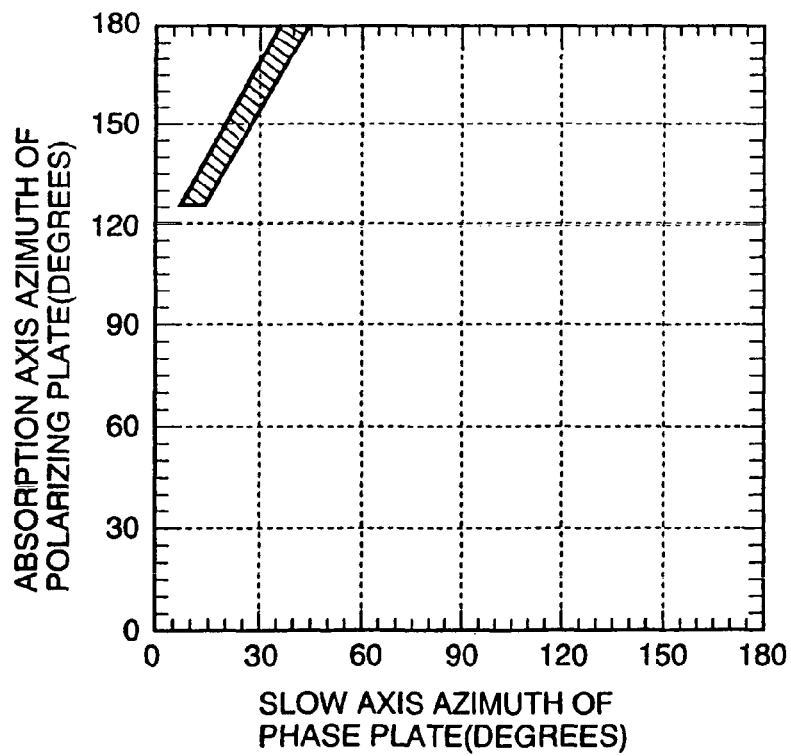
FIG. 17 illustrates the relationship between absorption axis azimuth of the polarizing plate and slow axis azimuth of the phase plate in the solution of group B.

In FIG. 16, the axis of abscissa is the liquid crystal layer retardation expressed in nm, and the axis of ordinate is the phase plate retardation expressed in nm. In FIG. 17, the axis of abscissa is the phase plate slow axis azimuth expressed in degrees, and the axis of ordinate is the polarizing plate absorption axis azimuth expressed in degrees.

In the third embodiment, combinations for fulfilling the solution were selected and set as follows. As shown in FIG. 16, the retardation of the liquid crystal layer 3 is in the range of 370 to 450 nm, and the retardation of the phase plate 4 is in the range of 280 to 340 nm. At the same time, as shown in FIG. 17, the slow axis azimuth of the phase plate 4 is set in the range of 5 to 50 degrees, and the absorption axis azimuth of the polarizing plate 5 is in the ranges of 0 to 10 degrees and 125 to 180 degrees.

Since the solution of group B was selected in the third embodiment, optical parameters of the liquid crystal layer 3, the phase plate 4 and the polarizing plate 5 were selected and set as follows. From the characteristic diagram shown in FIG. 4, the product of the liquid crystal layer thickness and birefringence of the liquid crystal material was set to be 395 nm, and the twist angle of the liquid crystal layer 3 was set to be 50 degrees. In addition, from the characteristic diagram shown in FIG. 5, the retardation of the phase plate 4 was set to be 300 nm. Further, from the characteristic diagram shown in FIG. 17, the slow axis azimuth of the phase plate 4 was set to be 15 degrees, and the absorption axis azimuth of the polarizing plate 5 was set to be 135 degrees.

Furthermore, while the twist angle of the liquid crystal layer 3 is set at 50 degrees in the third embodiment, attention was paid to the straight line of the twist angle of 40 degrees in the characteristic diagram of FIG. 6. When determining the product of the height of recesses and projections and the birefringence of the liquid crystal material for giving a contrast ratio of 20:1 in the straight line, the product of the height of recesses and projections and the birefringence of the liquid crystal material is not more than 53 nm, and, therefore, the product of the height of recesses and projections and the birefringence of the liquid crystal material was here set to be not more than 53 nm. In this case, if a liquid crystal material with a birefringence of 0.073 is used, the allowable height of recesses and projections is 0.73 μm, and, therefore, a slightly lower value of 0.5 μm is adopted.

When the reflection type liquid crystal display device according to the third embodiment obtained as above was evaluated, display characteristics of a normally closed type were obtained, the maximum of reflectance was 25.5%, and the contrast ratio was 32:1.

Incidentally, while the allowable value of the height of recesses and projections of the light-diffusive reflective electrode 13 is not more than 0.73 μm in the reflection type liquid crystal display device of the third embodiment, when display characteristics of such a setting that the height of recesses and projections has a value outside the allowable range, for example, a setting of a height of recesses and projections at 1.0 μm were evaluated, the contrast ratio was found to be as low as 15:1. Thus, it is seen that a high contrast ratio cannot be obtained if the height of recesses and projections of the light-diffusive reflective electrode 13 is not set within the allowable range.

In the reflection type liquid crystal display devices according to the first to the third embodiment described above, a normally closed type display mode was adopted in which a dark display condition is obtained at the time of application of no voltage to the liquid crystal layer 3 when the phase difference variation attendant on viewing angle variation is minimum, whereby the phase difference variation attendant on viewing angle variation is reduced, and a high contrast ratio is achieved. In addition to these means, in a reflection type liquid crystal display device according to a fourth embodiment, the phase plate 4 is constituted of a laminate structure of a first phase plate and a second phase plate, whereby a higher contrast ratio is obtained.

In the reflection type liquid crystal display device, the Nz coefficient of the first phase plate laminated is 0.0, the Nz coefficient of the second phase plate is 1.0, and the slow axes of the first and second phase plates are disposed orthogonally to each other. Namely, similarly to the reflection type liquid crystal display device of the third embodiment, the slow axis azimuth of the first phase plate is 15 degrees, and the slow axis azimuth of the second phase plate is orthogonal to this, namely, 105 degrees.

Now, where the retardation of the first phase plate is $\Delta nd_{P1}$, the retardation of the second phase plate is $\Delta nd_{P2}$, and the retardation which a single phase plate is demanded to have is $\Delta nd_S$, such an arrangement is made that the following formula is established among $\Delta nd_{P1}$, $\Delta nd_{P2}$ and $\Delta nd_S$.

$$\Delta nd_{P1} - \Delta nd_{P2} = \Delta nd_S$$

The left side of the formula is the resultant value of the retardations of the first and second phase plates, and such a setting is carried out that the resultant value is equal to the retardation which a single phase plate is demanded to have.

Figure 13:
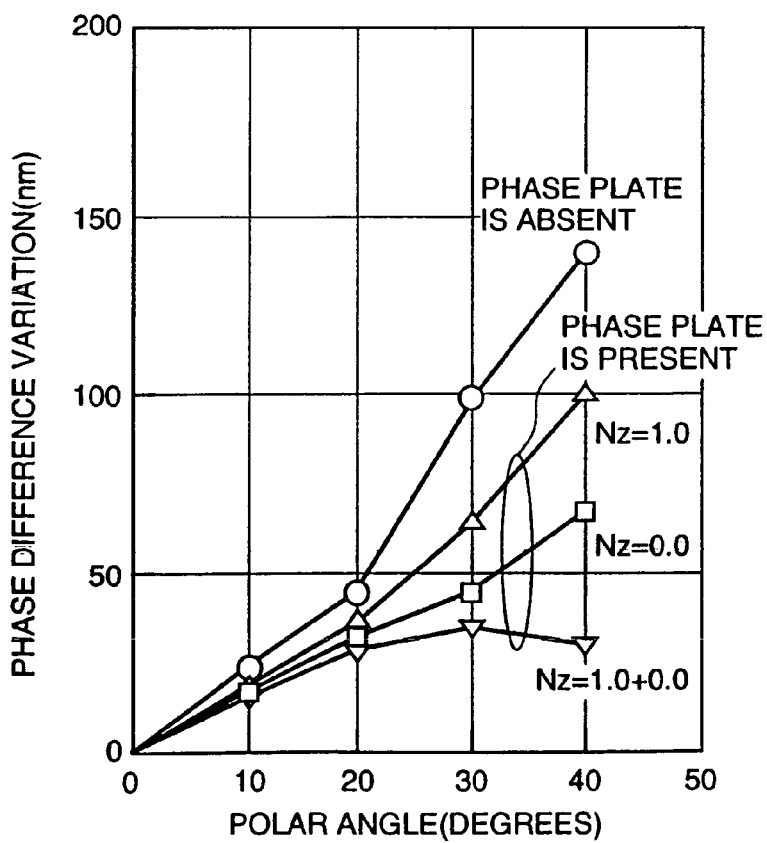
FIG. 13 illustrates the relationship between variation of viewing angle and phase difference variation.

FIG. 13 is a characteristic diagram showing the relationship between variation of viewing angle (polar angle) and phase difference variation in the reflection type liquid crystal display device according to the fourth embodiment. In FIG. 13, the axis of abscissa is the viewing angle (polar angle) expressed in degrees, and the axis of ordinate is the phase difference variation expressed in nm. There are shown the case of using a first phase plate with an Nz coefficient of 0.0 and a second phase plate with an Nz coefficient of 1.0, the case of using a phase plate 4 with an Nz coefficient of 0.0, the case of using a phase plate 4 with an Nz coefficient of 1.0, and the case of not using a phase plate 4.

As shown in FIG. 13, the phase difference variation is lowest in the case of using the first and second phase plates, is second lowest in the case of using the phase plate 4 with an Nz coefficient of 0.0, is third lowest in the case of using the phase plate 4 with an Nz coefficient of 1.0, and is most in the case of not using the phase plate 4. From these results, a highest contrast ratio is obtained in the case of using the first and second phase plates.

In the liquid crystal display device according to the fourth embodiment, the retardation of the first phase plate is 430 nm, and the retardation of the second phase plate is 130 nm. In this case, the difference between the retardation of the first phase plate and the retardation of the second phase plate is 300 nm, the same as in the liquid crystal display device according to the third embodiment. In the liquid crystal display device of the fourth embodiment, the contrast ratio was measured to be 36:1. Thus, in the liquid crystal display device of the fourth embodiment, the phase plate 4 was constituted of a laminate of the first phase plate and the second phase plate, and their retardations were optimized, so that the phase difference variation attendant on the viewing angle variation was more reduced, whereby a high contrast ratio of 36:1 could be obtained.

Figure 22:
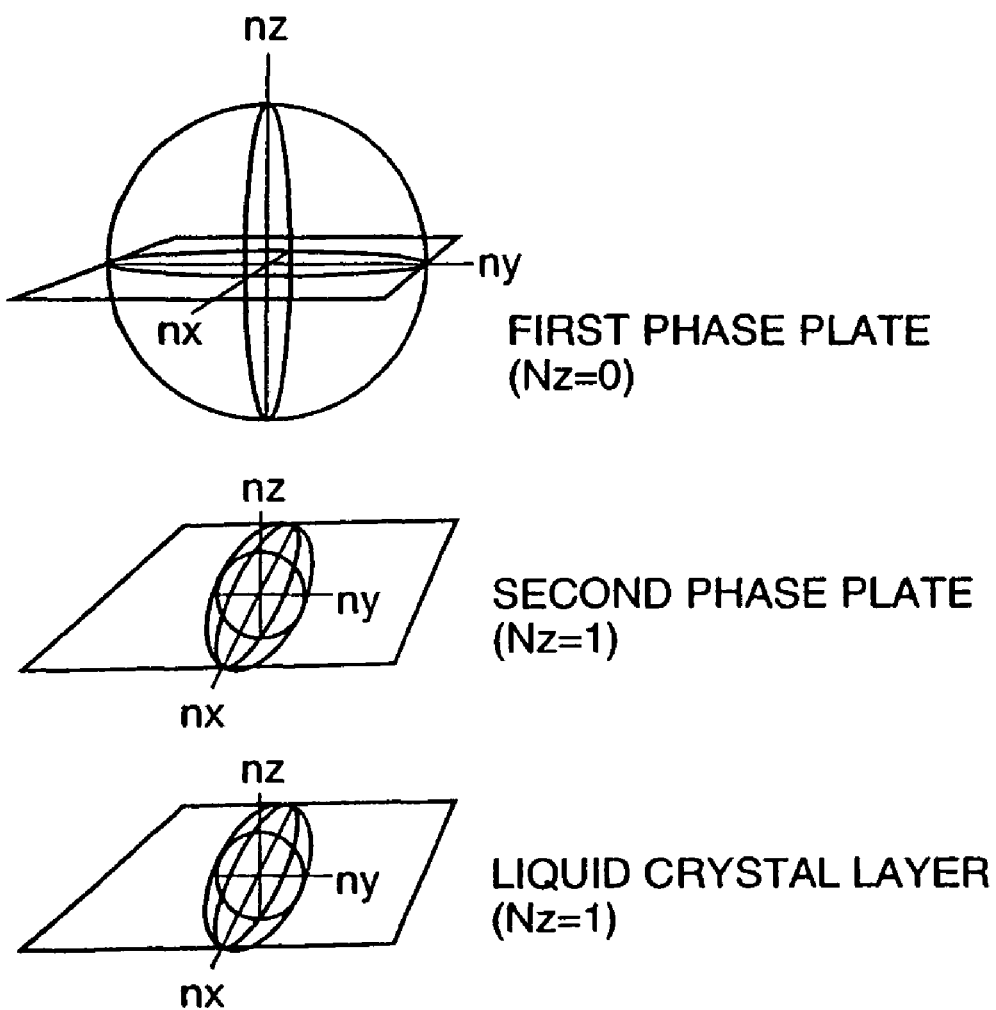
FIG. 22 illustrates conditions of refractive index ellipsoids in a first phase plate, a second phase plate and a liquid crystal layer.

As shown in FIG. 22, the slow axis of the second phase plate is substantially parallel to the orientation direction of the liquid crystal, and its Nz coefficient is 1.0, the same as that of the liquid crystal layer 3, which means that the retardation of the liquid crystal layer 3 is increased by $\Delta nd_{P2}$. At this time, the retardation of the first phase plate is increased by $\Delta nd_{P2}$, as compared to a case of using a single phase plate. The retardation $\Delta nd_{P2}$ of the second phase plate is compensated for by the increment $\Delta nd_{P2}$ of the retardation of the first phase plate, and, accordingly, the retardation as observed from the normal direction is the same as that in the reflection type liquid crystal display device according to the third embodiment. Therefore, in the reflection type liquid crystal display device according to the fourth embodiment, the compensation of the phase difference in the normal direction is accomplished in the same manner as in the reflection type liquid crystal display device of the third embodiment, and the phase difference can be brought to a value substantially close to a quarter of wavelength over a wide range of viewing angle.

Figure 18:
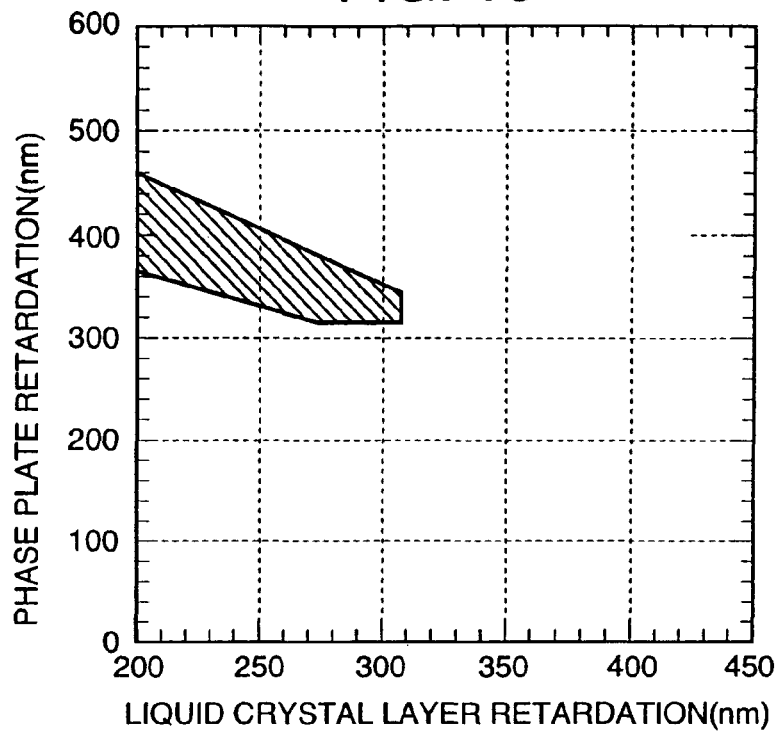
FIG. 18 illustrates the relationship between liquid crystal layer retardation and phase plate retardation in the solution of group D.
Figure 19:
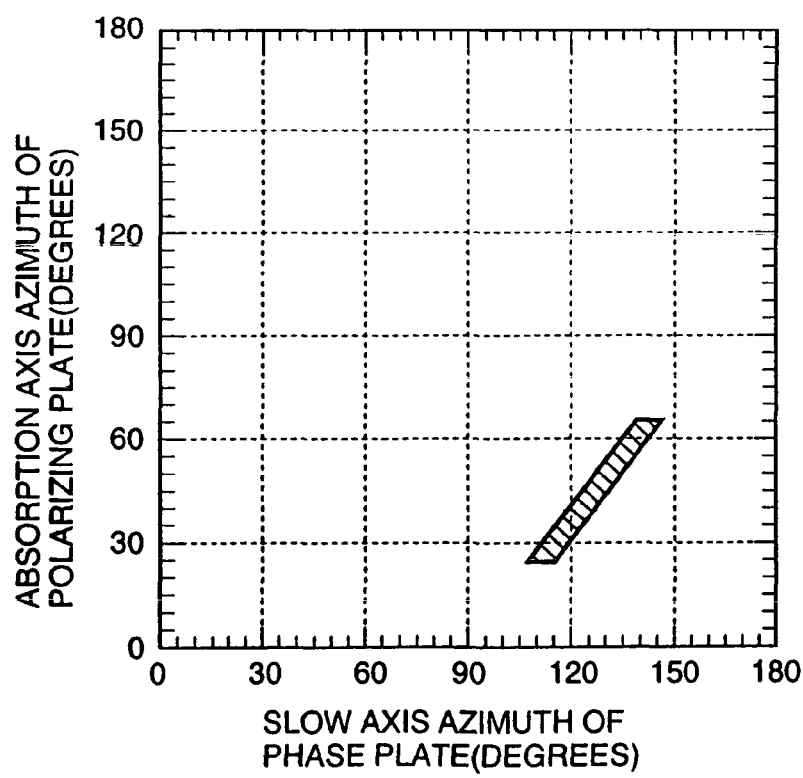
FIG. 19 illustrates the relationship between absorption axis azimuth of the polarizing plate and slow axis azimuth of the phase plate in the solution of group D.

Subsequently, in a fifth embodiment of the present invention, among the groups A to E showing the distribution regions of solutions giving a high contrast shown in FIGS. 4 and 5, the solution of group D is selected. In FIG. 18, the abscissa is the liquid crystal layer retardation expressed in nm, and the ordinate is the phase plate retardation expressed in nm. In FIG. 19, the abscissa is the slow axis azimuth of the phase plate expressed in degrees, and the ordinate is the absorption axis azimuth of the polarizing plate expressed in degrees.

In the fifth embodiment, combinations for fulfilling the solution are selected and set as follows. As shown in FIG. 18, the retardation of the liquid crystal layer 3 is in the range of 200 to 310 nm, and the retardation of the phase plate 4 is in the range of 320 to 460 nm. At the same time, as shown in FIG. 19, the slow axis azimuth of the phase plate 4 is in the range of 105 to 145 degrees, and the absorption axis azimuth of the polarizing plate 5 is in the range of 25 to 65 degrees.

In addition, since the solution of group D is selected in the fifth embodiment, optical parameters of the liquid crystal layer 3, the phase plate 4 and the polarizing plate 5 were selected and set as follows. From the characteristic diagram shown in FIG. 4, the product of the liquid crystal layer thickness and birefringence of the liquid crystal material was selected to be 255 nm, and the twist angle of the liquid crystal layer 3 was selected to be 75 degrees. In addition, from the characteristic diagram shown in FIG. 5, the retardation of the phase plate 4 was selected to be 360 nm. Further, from the characteristic diagram shown in FIG. 19, the slow axis azimuth of the phase plate 4 was selected to be 125 degrees, and the absorption axis azimuth of the polarizing plate 5 was selected to be 41 degrees.

Furthermore, since the twist angle of the liquid crystal layer 3 is selected to be 75 degrees in the fifth embodiment, attention was paid to the straight line of a twist angle of 75 degrees in the characteristic diagram shown in FIG. 6. When the product of the height of recesses and projections and the birefringence of the liquid crystal material for giving a contrast ratio of 20:1 in the straight line is determined, the product of the height of recesses and projections and the birefringence of the liquid crystal material is found to be not more than 74 nm, and, therefore, the product of the height of recesses and projections and the birefringence of the liquid crystal material is set to be not more than 74 nm. In this case, if a liquid crystal material having a birefringence of 0.073 is used, the allowable height of the recesses and projections is 1.01 μm, and, therefore, a lower value of 0.5 μm is adopted.

When the reflection type liquid crystal display device of the fifth embodiment thus obtained was evaluated, it was found that display characteristics of a normally closed type are obtained, the maximum of the reflectance is 24.8%, and the contrast ratio is 32:1.

Incidentally, while the allowable height of recesses and projections of the light-diffusive reflective electrode 13 is not more than 1.01 μm in the reflection type liquid crystal display device of the fifth embodiment, when display characteristics in the case of setting the height of recesses and projections at a value outside of the allowable range, for example, a setting of the height of recesses and projections at 1.5 μm were evaluated, the contrast ratio was found to be as low as 11:1.

Thus, it is seen that a high contrast ratio cannot be obtained if the height of recesses and projections of the light-diffusive reflective electrode 13 is not set in the allowable range.

In a sixth embodiment of the present invention, among groups A to E showing the distribution regions of solutions for giving a high contrast shown in FIGS. 4 and 5, the solution of group E has been selected. Here, FIG. 20 is a characteristic diagram showing the relationship between liquid crystal layer retardation and phase plate retardation in the solution of group E, and FIG. 21 is a characteristic diagram showing the relationship between the absorption axis azimuth of the polarizing plate and the slow axis azimuth of the phase plate in the solution of group E.

Figure 20:
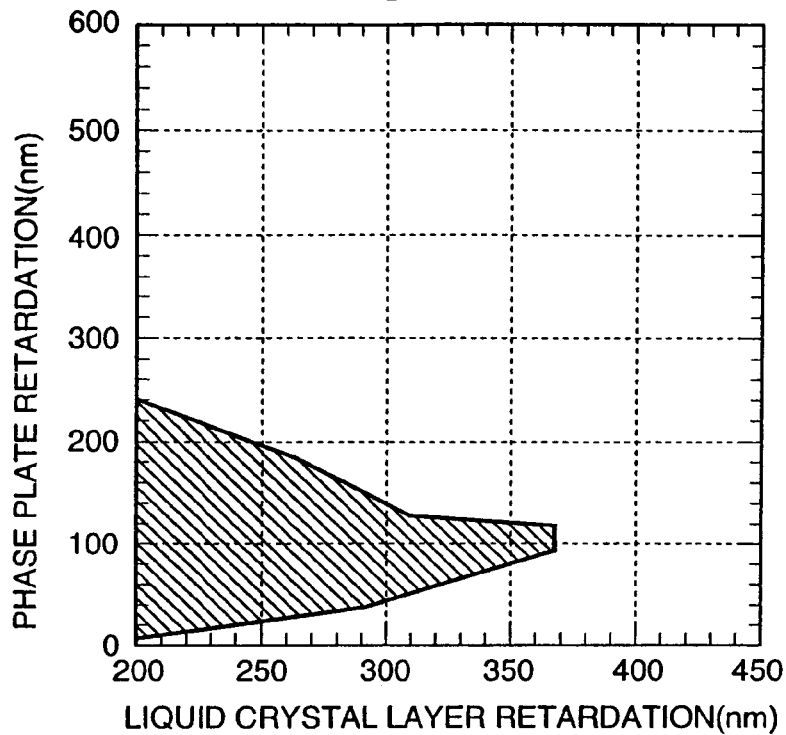
FIG. 20 illustrates the relationship between liquid crystal layer retardation and phase plate retardation in the solution of group E.
Figure 21:
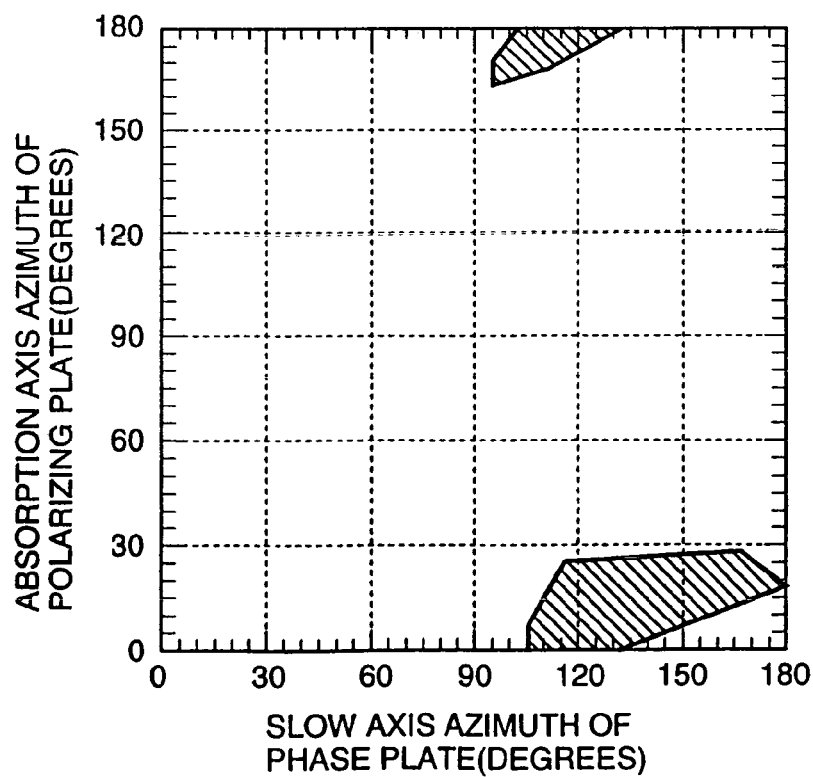
FIG. 21 illustrates the relationship between absorption axis azimuth of the polarizing plate and slow axis azimuth of the phase plate in the solution of group E.

In FIG. 20, the axis of abscissa is the liquid crystal layer retardation expressed in nm, and the axis of ordinate is the phase plate retardation expressed in nm. In FIG. 21, the axis of abscissa is the slow axis azimuth of the phase plate expressed in degrees, and the axis of ordinate is the absorption axis azimuth of the polarizing plate expressed in degrees.

In the sixth embodiment, combinations for fulfilling the solution were selected and set as follows. As shown in FIG. 20, the retardation of the liquid crystal layer 3 is in the range of 200 to 370 nm, and the retardation of the phase plate 4 is in the range of 10 to 240 nm. At the same time, as shown in FIG. 21, the slow axis azimuth of the phase plate 4 is in the range of 95 to 180 degrees, and the absorption axis azimuth of the polarizing plate 5 is in the ranges of 0 to 25 degrees and 160 to 180 degrees.

Also, since the solution of group E was selected in the sixth embodiment, optical parameters of the liquid crystal layer 3, the phase plate 4 and the polarizing plate 5 were selected and set as follows. From the characteristic diagram shown in FIG. 4, the product of the liquid crystal layer thickness and birefringence of the liquid crystal material was selected to be 290 nm, and the twist angle of the liquid crystal layer 3 was selected to be 90 degrees. In addition, from the characteristic diagram shown in FIG. 5, the retardation of the phase plate 4 was selected to be 130 nm. Further, from the characteristic diagram shown in FIG. 21, the slow axis azimuth of the phase plate 4 was selected to be 130 degrees, and the absorption axis azimuth of the polarizing plate 5 was selected to be 22 degrees.

Furthermore, while the twist angle of the liquid crystal layer 3 is selected at 90 degrees in the sixth embodiment, a focus was made to the straight line of a twist angle of 75 degrees in the characteristic diagram shown in FIG. 6. When the product of the height of recesses and projections and birefringence of the liquid crystal layer for giving a contrast ratio of 20:1 in the straight line is determined, the product of the height of recesses and projections and the birefringence of the liquid crystal material is found to be not more than 74 nm, and, therefore, the product of the height of recesses and projections and the birefringence of the liquid crystal material is set to be not more than 74 nm. In this case, if a liquid crystal material with a birefringence of 0.073 is used, the allowable height of recesses and projections is 1.01 μm and a lower value of 0.5 μm is adopted.

When the reflection type liquid crystal display device of the sixth embodiment obtained as above was evaluated, it was found that display characteristics of a normally closed type are obtained, the maximum of reflectance is 24.8%, and the contrast ratio is 25:1.

Incidentally, while the allowable height of recesses and projections of the light-diffusive reflective electrode 13 is not more than 1.01 μm in the reflection type liquid crystal display device of the sixth embodiment, when display characteristics in the case of setting the height of recesses and projections at a value outside of the allowable range, for example, a setting of the height of recesses and projections at 1.5 μm were evaluated, it was found that the contrast ratio is as low as 12:1. Thus, it is understood that a high contrast ratio cannot be obtained if the height of recesses and projections of the light-diffusive reflective electrode 13 is not set in the allowable range.

Hence, the present invention provides a liquid crystal display device comprising a liquid crystal layer sandwiched between an upper substrate and a lower substrate having a twist angle in the range of about 40 to 65 degrees and a light diffusive reflective electrode having recesses and projections provided on the lower substrate wherein a product of the height of the recesses and projections and a birefringence of the liquid crystal layer is in the range of about 10 to 53 nm at the twist angle of about 40 degrees and about 10 to 64 nm at the twist angle of about 65 degrees, respectively.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A liquid crystal display device, configured in a normally closed display mode, comprising:
   an upper substrate and a lower substrate disposed in a mutually facing relation;
   a liquid crystal layer sandwiched between said upper substrate and said lower substrate, the liquid crystal layer having a twist angle in the range of about 40 to 65 degrees;
   a light diffusive reflective electrode having recesses and projections provided on said lower substrate;
   a recess and projection forming layer disposed between said lower substrate and said light diffusive reflective electrode;
   a single phase plate provided on an outer surface of said upper substrate;
   a polarizing plate provided on an outer surface of said single phase plate;
   an electrode disposed between said upper substrate and said liquid crystal layer;
   a plurality of signal lines;
   a plurality of scanning lines disposed orthogonally to said plurality of signal lines; and
   a thin film transistor connected to said signal line and said scanning line;
   wherein a product of a height of said recesses and projections of the light diffusive reflective electrode and a birefringence of said liquid crystal layer is in the range of about 10 to 53 nm,
   wherein the twist angle and the retardation of said liquid crystal layer are within a region bounded by a straight line sequentially connecting a first set of points on a graph defined by the abscissa being the twist angle of a liquid crystal layer expressed in degrees and the ordinate being the retardation of the liquid crystal layer expressed in nm, the first set of points being: (50 degrees, 200 nm), (50 degrees, 275 nm), (40 degrees, 305 nm), (40 degrees, 350 nm), (65 degrees, 275 nm) and (65 degrees, 200 nm);
   wherein the twist angle of said liquid crystal layer and the retardation of said single phase plate are within a region bounded by a straight line sequentially connecting a second set of points on a graph defined by the abscissa being the twist angle of a liquid crystal layer expressed in degrees and the ordinate being the retardation of the single phase plate expressed in nm, the second set of points being: (50 degrees, 340 nm), (40 degrees, 420 nm), (40 degrees, 480 nm), (65 degrees, 440 nm) and (65 degrees, 290 nm); and wherein the single phase plate slow axis azimuth and the polarizing of plate absorption axis azimuth are defined counterclockwise by observing the liquid crystal display device from the normal direction of the upper substrate and setting the orientation direction of the lower substrate to be 0 degrees, and being within the region bounded by a straight line sequentially connecting a third set of points on a graph defined by the abscissa being the single phase plate slow axis azimuth expressed in degrees and the ordinate being the polarizing of plate absorption axis azimuth expressed in degrees, the third set of points being: (30 degrees, 32 degrees), (40 degrees, 50 degrees), (70 degrees, 88 degrees) and (75 degrees, 88 degrees), the azimuth is defined counterclockwise by observing said liquid crystal display device from the normal direction of said upper substrate and setting the orientation direction of said lower substrate to be 0 degrees.

2. A liquid crystal display device of claim 1, wherein the phase plate has a Nz coefficient of 0.0.

* * * * *